United States Patent
Sereshki et al.

(10) Patent No.: US 10,482,868 B2
(45) Date of Patent: Nov. 19, 2019

(54) MULTI-CHANNEL ACOUSTIC ECHO CANCELLATION

(71) Applicant: Sonos, Inc., Santa Barbara, CA (US)

(72) Inventors: Saeed Bagheri Sereshki, Goleta, CA (US); Romi Kadri, Santa Barbara, CA (US)

(73) Assignee: Sonos, Inc., Santa Barbara, CA (US)

(*) Notice: Subject to any disclaimer, the term of this patent is extended or adjusted under 35 U.S.C. 154(b) by 127 days.

(21) Appl. No.: 15/718,911

(22) Filed: Sep. 28, 2017

(65) Prior Publication Data
US 2019/0096384 A1   Mar. 28, 2019

(51) Int. Cl.
| | |
|---|---|
| *G10L 21/0208* | (2013.01) |
| *G10K 11/178* | (2006.01) |
| *H04L 29/06* | (2006.01) |
| *H04B 17/336* | (2015.01) |
| *H04R 27/00* | (2006.01) |

(Continued)

(52) U.S. Cl.
CPC ............ *G10K 11/178* (2013.01); *G06F 3/165* (2013.01); *G10L 21/0208* (2013.01); *H04B 17/336* (2015.01); *H04L 65/601* (2013.01); *H04M 9/082* (2013.01); *H04R 27/00* (2013.01); *G10K 2210/3012* (2013.01); *G10K 2210/505* (2013.01); *G10L 2021/02082* (2013.01); *H04R 2227/005* (2013.01)

(58) Field of Classification Search
CPC ......... G10K 11/178; G10K 2210/3012; H04R 27/00; G10L 21/0208; G10L 21/0232; H04M 9/082

USPC .......................................................... 381/66
See application file for complete search history.

(56) References Cited

U.S. PATENT DOCUMENTS

| | | |
|---|---|---|
| 4,941,187 A | 7/1990 | Slater |
| 5,440,644 A | 8/1995 | Farinelli et al. |
| 5,740,260 A | 4/1998 | Odom |

(Continued)

FOREIGN PATENT DOCUMENTS

| | | |
|---|---|---|
| AU | 2017100486 A4 | 6/2017 |
| AU | 2017100581 A4 | 6/2017 |

(Continued)

OTHER PUBLICATIONS

US 9,299,346 B1, 03/2016, Hart et al. (withdrawn)

(Continued)

*Primary Examiner* — Vivian C Chin
*Assistant Examiner* — Ubachukwu A Odunukwe

(57) ABSTRACT

A method of operating a playback device includes receiving source audio content that includes a first and second channel stream of audio. The method also includes playing back, via a first and second speaker driver of the playback device, the first and second channel streams of audio, thereby producing a first and second channel audio output. A captured stream of audio is received by a microphone of the playback device, and portions of the captured stream of audio correspond to the first and second channel audio outputs. The first and second channel streams of audio are combined into a compound audio signal, and acoustic echo cancellation is performed on the compound audio signal to produce an acoustic echo cancellation output, which is then applied to the captured stream of audio to increase the signal-to noise ratio of the captured stream of audio.

16 Claims, 11 Drawing Sheets

(51) Int. Cl.
*G06F 3/16* (2006.01)
*H04M 9/08* (2006.01)

(56) References Cited

U.S. PATENT DOCUMENTS

| | | |
|---|---|---|
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,301,603 B1 | 10/2001 | Maher et al. |
| 6,311,157 B1 | 10/2001 | Strong |
| 6,404,811 B1 | 6/2002 | Cvetko et al. |
| 6,469,633 B1 | 10/2002 | Wachter |
| 6,522,886 B1 | 2/2003 | Youngs et al. |
| 6,594,347 B1 | 7/2003 | Calder et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,661,107 B1 | 2/2010 | Van et al. |
| 7,702,508 B2 | 4/2010 | Bennett |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,041,565 B1 | 10/2011 | Bhardwaj et al. |
| 8,045,952 B2 | 10/2011 | Qureshey et al. |
| 8,073,125 B2 | 12/2011 | Zhang et al. |
| 8,103,009 B2 | 1/2012 | McCarty et al. |
| 8,234,395 B2 | 7/2012 | Millington et al. |
| 8,239,206 B1 | 8/2012 | Lebeau et al. |
| 8,255,224 B2 | 8/2012 | Singleton et al. |
| 8,290,603 B1 | 10/2012 | Lambourne |
| 8,364,481 B2 | 1/2013 | Strope et al. |
| 8,386,261 B2 | 2/2013 | Mellott et al. |
| 8,423,893 B2 | 4/2013 | Ramsay et al. |
| 8,428,758 B2 | 4/2013 | Naik et al. |
| 8,453,058 B1 | 5/2013 | Coccaro et al. |
| 8,483,853 B1 | 7/2013 | Lambourne |
| 8,484,025 B1 | 7/2013 | Moreno et al. |
| 8,831,761 B2 | 9/2014 | Kemp et al. |
| 8,831,957 B2 | 9/2014 | Taubman et al. |
| 8,938,394 B1 | 1/2015 | Faaborg et al. |
| 8,942,252 B2 | 1/2015 | Balassanian et al. |
| 8,983,844 B1 | 3/2015 | Thomas et al. |
| 9,042,556 B2 | 5/2015 | Kallai et al. |
| 9,094,539 B1 | 7/2015 | Noble |
| 9,215,545 B2 | 12/2015 | Dublin et al. |
| 9,251,793 B2 | 2/2016 | Lebeau et al. |
| 9,262,612 B2 | 2/2016 | Cheyer |
| 9,288,597 B2 | 3/2016 | Carlsson et al. |
| 9,300,266 B2 | 3/2016 | Grokop |
| 9,318,107 B1 | 4/2016 | Sharifi |
| 9,319,816 B1 | 4/2016 | Narayanan |
| 9,412,392 B2 | 8/2016 | Lindahl et al. |
| 9,426,567 B2 | 8/2016 | Lee et al. |
| 9,431,021 B1 | 8/2016 | Scalise et al. |
| 9,443,527 B1 | 9/2016 | Watanabe et al. |
| 9,472,201 B1 | 10/2016 | Sleator |
| 9,472,203 B1 | 10/2016 | Ayrapetian et al. |
| 9,484,030 B1 | 11/2016 | Meaney et al. |
| 9,489,948 B1 | 11/2016 | Chu et al. |
| 9,494,683 B1 | 11/2016 | Sadek |
| 9,509,269 B1 | 11/2016 | Rosenberg |
| 9,514,752 B2 | 12/2016 | Sharifi |
| 9,536,541 B2 | 1/2017 | Chen et al. |
| 9,548,066 B2 | 1/2017 | Jain et al. |
| 9,552,816 B2 | 1/2017 | Vanlund et al. |
| 9,560,441 B1 | 1/2017 | McDonough, Jr. et al. |
| 9,601,116 B2 | 3/2017 | Casado et al. |
| 9,615,170 B2 | 4/2017 | Kirsch et al. |
| 9,615,171 B1 | 4/2017 | O'Neill et al. |
| 9,632,748 B2 | 4/2017 | Faaborg et al. |
| 9,633,186 B2 | 4/2017 | Ingrassia, Jr. et al. |
| 9,633,368 B2 | 4/2017 | Greenzeiger et al. |
| 9,633,660 B2 | 4/2017 | Haughay et al. |
| 9,633,671 B2 | 4/2017 | Giacobello et al. |
| 9,633,674 B2 | 4/2017 | Sinha et al. |
| 9,640,179 B1 | 5/2017 | Hart et al. |
| 9,640,183 B2 | 5/2017 | Jung et al. |
| 9,641,919 B1 | 5/2017 | Poole et al. |
| 9,646,614 B2 | 5/2017 | Bellegarda et al. |
| 9,653,060 B1 | 5/2017 | Hilmes et al. |
| 9,653,075 B1 | 5/2017 | Chen et al. |
| 9,659,555 B1 | 5/2017 | Hilmes et al. |
| 9,672,821 B2 | 6/2017 | Krishnaswamy et al. |
| 9,685,171 B1 | 6/2017 | Yang |
| 9,691,378 B1 | 6/2017 | Meyers et al. |
| 9,691,379 B1 | 6/2017 | Mathias et al. |
| 9,697,826 B2 | 7/2017 | Sainath et al. |
| 9,697,828 B1 | 7/2017 | Prasad et al. |
| 9,698,999 B2 | 7/2017 | Mutagi et al. |
| 9,704,478 B1 | 7/2017 | Vitaladevuni et al. |
| 9,721,568 B1 | 8/2017 | Polansky et al. |
| 9,721,570 B1 | 8/2017 | Beal et al. |
| 9,728,188 B1 | 8/2017 | Rosen et al. |
| 9,734,822 B1 | 8/2017 | Sundaram et al. |
| 9,747,011 B2 | 8/2017 | Lewis et al. |
| 9,747,899 B2 | 8/2017 | Pogue et al. |
| 9,747,920 B2 | 8/2017 | Ayrapetian et al. |
| 9,747,926 B2 | 8/2017 | Sharifi et al. |
| 9,754,605 B1 | 9/2017 | Chhetri |
| 9,826,306 B2 | 11/2017 | Lang |
| 10,013,995 B1 * | 7/2018 | Lashkari ............. G10L 21/0208 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0034280 A1 | 3/2002 | Infosino |
| 2002/0072816 A1 | 6/2002 | Shdema et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2005/0195988 A1 | 9/2005 | Tashev et al. |
| 2005/0283330 A1 | 12/2005 | Laraia et al. |
| 2006/0147058 A1 | 7/2006 | Wang |
| 2006/0190968 A1 | 8/2006 | Jung et al. |
| 2006/0247913 A1 | 11/2006 | Huerta et al. |
| 2007/0018844 A1 | 1/2007 | Sutardja |
| 2007/0019815 A1 | 1/2007 | Asada et al. |
| 2007/0033043 A1 | 2/2007 | Hyakumoto |
| 2007/0076131 A1 | 4/2007 | Li et al. |
| 2007/0140058 A1 | 6/2007 | McIntosh et al. |
| 2007/0142944 A1 | 6/2007 | Goldberg et al. |
| 2008/0090537 A1 | 4/2008 | Sutardja |
| 2008/0248797 A1 | 10/2008 | Freeman et al. |
| 2009/0003620 A1 | 1/2009 | McKillop et al. |
| 2009/0005893 A1 | 1/2009 | Sugii et al. |
| 2009/0018828 A1 | 1/2009 | Nakadai et al. |
| 2009/0076821 A1 | 3/2009 | Brenner et al. |
| 2009/0197524 A1 | 8/2009 | Haff et al. |
| 2009/0228919 A1 | 9/2009 | Zott et al. |
| 2009/0238377 A1 | 9/2009 | Ramakrishnan et al. |
| 2009/0326949 A1 | 12/2009 | Douthitt et al. |
| 2010/0014690 A1 | 1/2010 | Wolff et al. |
| 2010/0023638 A1 | 1/2010 | Bowman |
| 2010/0075723 A1 | 3/2010 | Min et al. |
| 2010/0179874 A1 | 7/2010 | Higgins et al. |
| 2010/0211199 A1 | 8/2010 | Naik et al. |
| 2011/0033059 A1 | 2/2011 | Bhaskar et al. |
| 2011/0044461 A1 * | 2/2011 | Kuech ................... H04M 9/082 381/66 |
| 2011/0091055 A1 | 4/2011 | Leblanc |
| 2011/0145581 A1 | 6/2011 | Malhotra et al. |
| 2011/0267985 A1 | 11/2011 | Wilkinson et al. |

(56) References Cited

U.S. PATENT DOCUMENTS

| | | |
|---|---|---|
| 2011/0280422 A1 | 11/2011 | Neumeyer et al. |
| 2011/0299706 A1 | 12/2011 | Sakai |
| 2012/0131125 A1 | 5/2012 | Seidel et al. |
| 2012/0163603 A1 | 6/2012 | Abe et al. |
| 2012/0177215 A1 | 7/2012 | Bose et al. |
| 2012/0297284 A1 | 11/2012 | Matthews, III et al. |
| 2013/0006453 A1 | 1/2013 | Wang et al. |
| 2013/0024018 A1 | 1/2013 | Chang et al. |
| 2013/0058492 A1 | 3/2013 | Silzle et al. |
| 2013/0066453 A1 | 3/2013 | Seefeldt |
| 2013/0148821 A1 | 6/2013 | Sorensen |
| 2013/0179173 A1 | 7/2013 | Lee et al. |
| 2013/0183944 A1 | 7/2013 | Mozer et al. |
| 2013/0191122 A1 | 7/2013 | Mason |
| 2013/0216056 A1 | 8/2013 | Thyssen |
| 2013/0317635 A1 | 11/2013 | Bates et al. |
| 2013/0329896 A1 | 12/2013 | Krishnaswamy et al. |
| 2013/0331970 A1 | 12/2013 | Beckhardt et al. |
| 2013/0343567 A1 | 12/2013 | Triplett et al. |
| 2014/0003611 A1 | 1/2014 | Mohammad et al. |
| 2014/0003635 A1 | 1/2014 | Mohammad et al. |
| 2014/0006026 A1 | 1/2014 | Lamb et al. |
| 2014/0064501 A1 | 3/2014 | Olsen et al. |
| 2014/0075306 A1 | 3/2014 | Rega |
| 2014/0094151 A1 | 4/2014 | Klappert et al. |
| 2014/0100854 A1 | 4/2014 | Chen et al. |
| 2014/0167931 A1 | 6/2014 | Lee et al. |
| 2014/0195252 A1 | 7/2014 | Gruber et al. |
| 2014/0244013 A1 | 8/2014 | Reilly |
| 2014/0258292 A1 | 9/2014 | Thramann et al. |
| 2014/0270282 A1 | 9/2014 | Tammi et al. |
| 2014/0274185 A1 | 9/2014 | Luna et al. |
| 2014/0363022 A1 | 12/2014 | Dizon et al. |
| 2015/0010169 A1 | 1/2015 | Popova et al. |
| 2015/0016642 A1 | 1/2015 | Walsh et al. |
| 2015/0086034 A1 | 3/2015 | Lombardi et al. |
| 2015/0104037 A1 | 4/2015 | Lee et al. |
| 2015/0154976 A1 | 6/2015 | Mutagi |
| 2015/0180432 A1 | 6/2015 | Gao et al. |
| 2015/0189438 A1 | 7/2015 | Hampiholi et al. |
| 2015/0200454 A1 | 7/2015 | Heusdens et al. |
| 2015/0222987 A1 | 8/2015 | Angel, Jr. et al. |
| 2015/0228274 A1 | 8/2015 | Leppänen et al. |
| 2015/0253292 A1 | 9/2015 | Larkin et al. |
| 2015/0253960 A1 | 9/2015 | Lin et al. |
| 2015/0271593 A1 | 9/2015 | Sun et al. |
| 2015/0280676 A1 | 10/2015 | Holman et al. |
| 2015/0296299 A1 | 10/2015 | Klippel et al. |
| 2015/0302856 A1 | 10/2015 | Kim et al. |
| 2015/0341406 A1 | 11/2015 | Rockefeller et al. |
| 2015/0363061 A1 | 12/2015 | De, III et al. |
| 2015/0363401 A1 | 12/2015 | Chen et al. |
| 2015/0371657 A1 | 12/2015 | Gao et al. |
| 2015/0380010 A1 | 12/2015 | Srinivasan |
| 2016/0007116 A1 | 1/2016 | Holman |
| 2016/0021458 A1 | 1/2016 | Johnson et al. |
| 2016/0029142 A1 | 1/2016 | Isaac et al. |
| 2016/0036962 A1 | 2/2016 | Rand et al. |
| 2016/0042748 A1 | 2/2016 | Jain et al. |
| 2016/0057522 A1 | 2/2016 | Choisel et al. |
| 2016/0077710 A1 | 3/2016 | Lewis et al. |
| 2016/0093304 A1 | 3/2016 | Kim et al. |
| 2016/0098393 A1 | 4/2016 | Hebert |
| 2016/0157035 A1 | 6/2016 | Russell et al. |
| 2016/0173578 A1 | 6/2016 | Sharma et al. |
| 2016/0212538 A1 | 7/2016 | Fullam et al. |
| 2016/0225385 A1 | 8/2016 | Hammarqvist |
| 2016/0232451 A1 | 8/2016 | Scherzer |
| 2016/0234204 A1 | 8/2016 | Rishi et al. |
| 2016/0239255 A1 | 8/2016 | Chavez et al. |
| 2016/0260431 A1 | 9/2016 | Newendorp et al. |
| 2016/0314782 A1 | 10/2016 | Klimanis |
| 2016/0352915 A1 | 12/2016 | Gautama |
| 2016/0353218 A1 | 12/2016 | Starobin et al. |
| 2017/0003931 A1 | 1/2017 | Dvortsov et al. |
| 2017/0026769 A1 | 1/2017 | Patel |
| 2017/0060526 A1 | 3/2017 | Barton et al. |
| 2017/0070478 A1 | 3/2017 | Park et al. |
| 2017/0076720 A1 | 3/2017 | Gopalan et al. |
| 2017/0078824 A1 | 3/2017 | Heo |
| 2017/0084292 A1 | 3/2017 | Yoo |
| 2017/0090864 A1 | 3/2017 | Jorgovanovic |
| 2017/0092278 A1 | 3/2017 | Evermann et al. |
| 2017/0092297 A1 | 3/2017 | Sainath et al. |
| 2017/0103755 A1 | 4/2017 | Jeon et al. |
| 2017/0125037 A1 | 5/2017 | Shin |
| 2017/0177585 A1 | 6/2017 | Rodger et al. |
| 2017/0178662 A1 | 6/2017 | Ayrapetian et al. |
| 2017/0193999 A1 | 7/2017 | Aleksic et al. |
| 2017/0206896 A1 | 7/2017 | Ko et al. |
| 2017/0236512 A1 | 8/2017 | Williams et al. |
| 2017/0242653 A1 | 8/2017 | Lang et al. |
| 2017/0270919 A1 | 9/2017 | Parthasarathi et al. |
| 2019/0074025 A1* | 3/2019 | Lashkari ............. G10L 21/0232 |

FOREIGN PATENT DOCUMENTS

| | | |
|---|---|---|
| EP | 1349146 A1 | 10/2003 |
| EP | 1389853 A1 | 2/2004 |
| EP | 2351021 B1 | 9/2017 |
| JP | 2001236093 A | 8/2001 |
| JP | 2004347943 A | 12/2004 |
| JP | 2004354721 A | 12/2004 |
| JP | 2005284492 A | 10/2005 |
| JP | 2008079256 A | 4/2008 |
| JP | 2008158868 A | 7/2008 |
| JP | 2010141748 A | 6/2010 |
| JP | 2013037148 A | 2/2013 |
| JP | 2014071138 A | 4/2014 |
| JP | 2014137590 A | 7/2014 |
| KR | 20100111071 A | 10/2010 |
| WO | 200153994 | 7/2001 |
| WO | 2003093950 A2 | 11/2003 |
| WO | 2015037396 A1 | 3/2015 |
| WO | 2015178950 A1 | 11/2015 |
| WO | 2016033364 A1 | 3/2016 |
| WO | 2017039632 A1 | 3/2017 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Corrected Notice of Allowability dated Mar. 8, 2017, issued in connection with U.S. Appl. No. 15/229,855, filed Aug. 5, 2016, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report dated Oct. 30, 2017, issued in connection with EP Application No. 17174435.2, 11 pages.
Final Office Action dated Oct. 6, 2017, issued in connection with U.S. Appl. No. 15/098,760, filed Apr. 14, 2016, 25 pages.
Final Office Action dated Aug. 11, 2017, issued in connection with U.S. Appl. No. 15/131,776, filed Apr. 18, 2016, 7 pages.
Final Office Action dated Jun. 15, 2017, issued in connection with U.S. Appl. No. 15/098,718, filed Apr. 14, 2016, 15 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
Freiberger, Karl, "Development and Evaluation of Source Localization Algorithms for Coincident Microphone Arrays," Diploma Thesis, Apr. 1, 2010, 106 pages.

(56) References Cited

OTHER PUBLICATIONS

International Searching Authority, International Search Report and Written Opinion dated Nov. 22, 2017, issued in connection with International Application No. PCT/US2017/054063, filed on Sep. 28, 2017, 11 pages.
International Searching Authority, International Search Report and Written Opinion dated May 23, 2017, issued in connection with International Application No. PCT/US2017/018739, Filed on Feb. 21, 2017, 10 pages.
International Searching Authority, International Search Report and Written Opinion dated Oct. 23, 2017, issued in connection with International Application No. PCT/US2017/042170, filed on Jul. 14, 2017, 15 pages.
International Searching Authority, International Search Report and Written Opinion dated Oct. 24, 2017, issued in connection with International Application No. PCT/US2017/042227, filed on Jul. 14, 2017, 16 pages.
International Searching Authority, International Search Report and Written Opinion dated May 30, 2017, issued in connection with International Application No. PCT/US2017/018728, Filed on Feb. 21, 2017, 11 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Morales-Cordovilla et al. "Room Localization for Distant Speech Recognition," Proceedings of Interspeech 2014, Sep. 14, 2014, 4 pages.
Non-Final Office Action dated Jun. 1, 2017, issued in connection with U.S. Appl. No. 15/223,218, filed Jul. 29, 2016, 7 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21, 2017, 11 pages.
Non-Final Office Action dated Feb. 7, 2017, issued in connection with U.S. Appl. No. 15/131,244, filed Apr. 18, 2016, 12 pages.
Non-Final Office Action dated Feb. 8, 2017, issued in connection with U.S. Appl. No. 15/098,892, filed Apr. 14, 2016, 17 pages.
Non-Final Office Action dated Mar. 9, 2017, issued in connection with U.S. Appl. No. 15/098,760, filed Apr. 14, 2016, 13 pages.
Non-Final Office Action dated Jan. 10, 2018, issued in connection with U.S. Appl. No. 15/098,718, filed Apr. 14, 2016, 15 pages.
Notice of Allowance dated Jun. 14, 2017, issued in connection with U.S. Appl. No. 15/282,554, filed Sep. 30, 2016, 11 pages.
Notice of Allowance dated Dec. 15, 2017, issued in connection with U.S. Appl. No. 15/223,218, filed Jul. 29, 2016, 7 pages.
Notice of Allowance dated Aug. 16, 2017, issued in connection with U.S. Appl. No. 15/098,892, filed Apr. 14, 2016, 9 pages.
Notice of Allowance dated Aug. 17, 2017, issued in connection with U.S. Appl. No. 15/131,244, filed Apr. 18, 2016, 9 pages.
Notice of Allowance dated Aug. 22, 2017, issued in connection with U.S. Appl. No. 15/273,679, filed Sep. 22, 2016, 5 pages.
Notice of Allowance dated Jan. 22, 2018, issued in connection with U.S. Appl. No. 15/178,180, filed Jun. 9, 2016, 9 pages.
Notice of Allowance dated Dec. 29, 2017, issued in connection with U.S. Appl. No. 15/131,776, filed Apr. 18, 2016, 13 pages.
Palm, Inc., "Handbook for the Palm VII Handheld," May 2000, 311 pages.
Presentations at WinHEC 2000, May 2000, 138 pages.
Tsiami et al. "Experiments in acoustic source localization using sparse arrays in adverse indoors environments", 2014 22nd European Signal Processing Conference, Sep. 1, 2014, 5 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Notice of Allowance dated Feb. 14, 2017, issued in connection with U.S. Appl. No. 15/229,855, filed Aug. 5, 2016, 11 pages.
Notice of Allowance dated Aug. 14, 2017, issued in connection with U.S. Appl. No. 15/098,867, filed Apr. 14, 2016, 10 pages.
Notice of Allowance dated Dec. 13, 2017, issued in connection with U.S. Appl. No. 15/784,952, filed Oct. 16, 2017, 9 pages.
Notice of Allowance dated Jul. 12, 2017, issued in connection with U.S. Appl. No. 15/098,805, filed Apr. 14, 2016, 8 pages.
Notice of Allowance dated Dec. 4, 2017, issued in connection with U.S. Appl. No. 15/277,810, filed Sep. 27, 2016, 5 pages.
Non-Final Office Action dated Sep. 6, 2017, issued in connection with U.S. Appl. No. 15/131,254, filed Apr. 18, 2016, 13 pages.
Non-Final Office Action dated Feb. 6, 2018, issued in connection with U.S. Appl. No. 15/237,133, filed Aug. 15, 2016, 6 pages.
Non-Final Office Action dated Feb. 6, 2018, issued in connection with U.S. Appl. No. 15/211,689, filed Jul. 15, 2016, 32 pages.
Non-Final Office Action dated Jun. 30, 2017, issued in connection with U.S. Appl. No. 15/277,810, filed Sep. 27, 2016, 13 pages.
Non-Final Office Action dated Oct. 26, 2017, issued in connection with U.S. Appl. No. 15/438,744, filed Feb. 21, 2017, 12 pages.
Non-Final Office Action dated Jan. 26, 2017, issued in connection with U.S. Appl. No. 15/098,867, filed Apr. 14, 2016, 16 pages.
Non-Final Office Action dated Jul. 25, 2017, issued in connection with U.S. Appl. No. 15/273,679, filed Jul. 22, 2016, 11 pages.
Non-Final Office Action dated Feb. 20, 2018, issued in connection with U.S. Appl. No. 15/211,748, filed Jul. 15, 2016, 31 pages.
Non-Final Office Action dated Apr. 19, 2017, issued in connection with U.S. Appl. No. 15/131,776, filed Apr. 18, 2016, 12 pages.
Non-Final Office Action dated Jan. 10, 2018, issued in connection with U.S. Appl. No. 15/438,725, filed Feb. 21, 2017, 15 pages.
Non-Final Office Action dated Dec. 12, 2016, issued in connection with U.S. Appl. No. 15/098,718, filed Apr. 14, 2016, 11 pages.
Non-Final Office Action dated Jan. 13, 2017, issued in connection with U.S. Appl. No. 15/098,805, filed Apr. 14, 2016, 11 pages.
Non-Final Office Action dated Sep. 14, 2017, issued in connection with U.S. Appl. No. 15/178,180, filed Jun. 9, 2016, 16 pages.
Non-Final Office Action dated Jan. 10, 2018, issued in connection with U.S. Appl. No. 15/229,868, filed Aug. 5, 2016, 13 pages.

* cited by examiner ns, entitled
MULTI-CHANNEL ACOUSTIC ECHO CANCELLATION

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
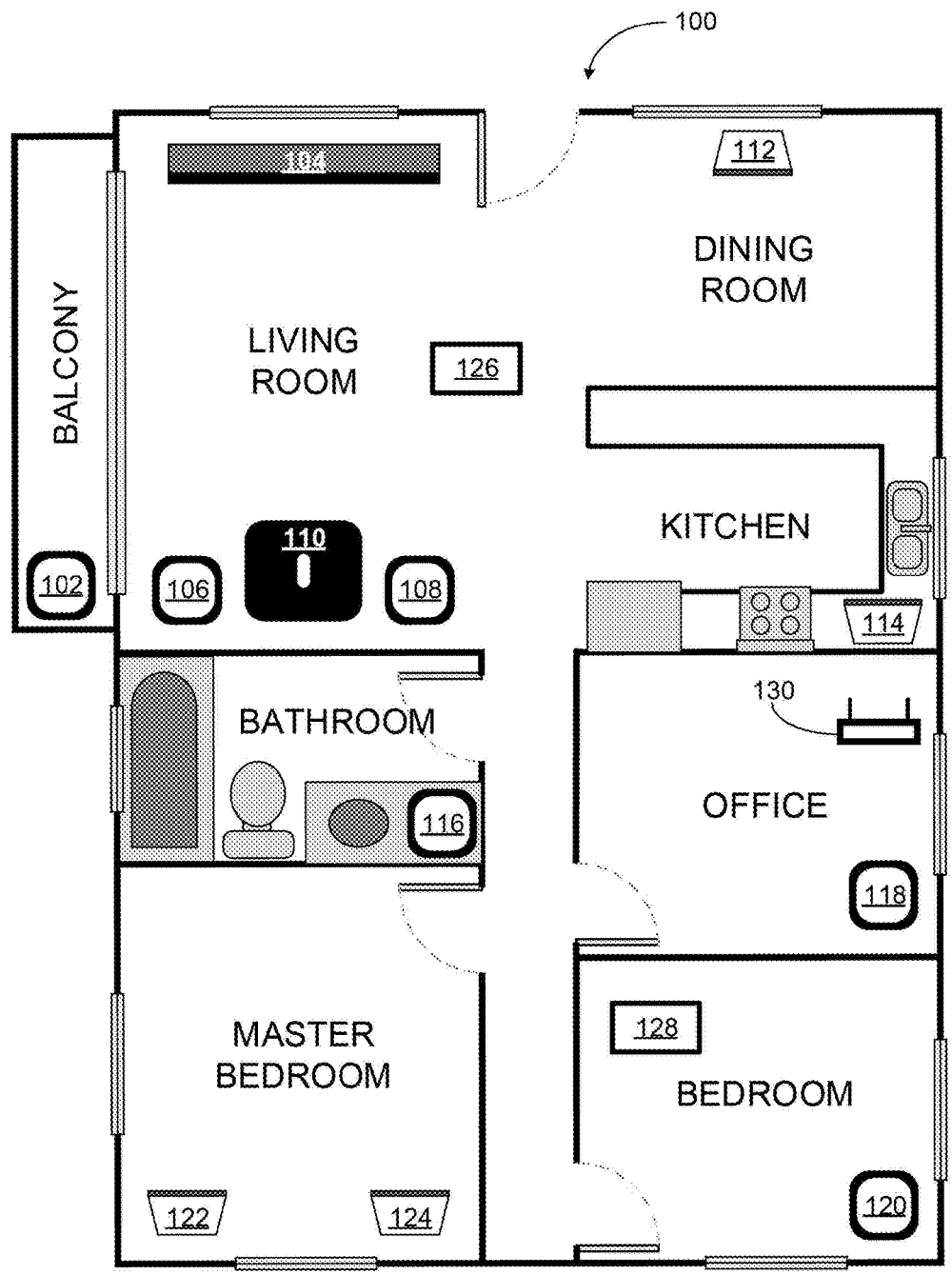
FIG. 1 shows a media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Some playback devices configured to play back music and/or other audio content also have voice control capabilities. These playback devices may be configured to receive vocal commands from a user via a microphone, analyze the received vocal commands, and translate the vocal commands for execution by the playback device. For example, if a user speaks a vocal command to "play the Rolling Stones", the playback device may capture this command via the microphone, analyze and translate the command, and correspondingly play back music from the Rolling Stones.

However, in some instances, the user may issue vocal commands when the playback device is already playing back media, and the microphone may capture audio that corresponds to both the user's vocal commands and the media output by the playback device. In such circumstances, the media that is output by the playback device may comprise "noise" that can obscure the user's vocal command to the playback device. In other circumstances, the audio captured by the microphone of the media playback by the playback device may itself be interpreted as a voice command issued to the playback device, and the playback device may devote computational resources to determine the nature of this false "command" captured by the microphone.

Thus, performing acoustic echo cancellation on the captured signal may "filter out" the output of the media played back by the playback device, thereby increasing the signal-to-noise ratio of the signal captured by the microphone. Essentially, the acoustic echo cancellation process removes the unwanted audio played by the playback device from the audio signal captured by the microphone, thereby making the voice command on the captured audio more clear.

However, performing acoustic echo cancellation using a playback device having more than one speaker (e.g., a multi-channel playback system) may have associated disadvantages. Specifically, a stream of audio signals is typically sent to each of the two or more speaker drivers of the playback device, and each stream of audio signals must be individually filtered from the captured audio by acoustic echo cancellation. This filtering process typically requires a substantial amount of computational resources, which is often beyond the computational capabilities of a CPU of a typical playback device.

The examples provided herein involve methods, playback devices, and systems that allow multi-channel acoustic echo cancellation to be performed using less computational resources than the previously-described acoustic echo cancellation process. In some embodiments, multi-channel acoustic echo cancellation can be performed using existing CPUs of playback devices.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
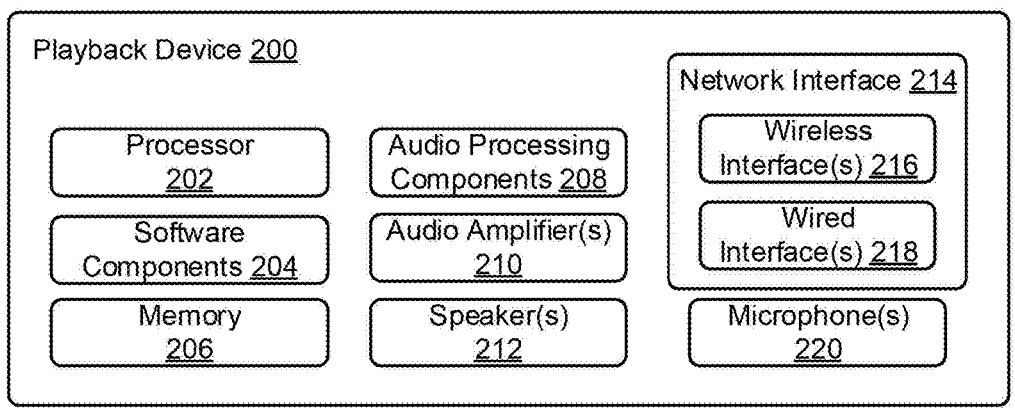
FIG. 2 is a functional block diagram of an example playback device according to aspects described herein.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audiovisual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is incorporated by reference herein in its entirety, provides detailed examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for very low frequencies), a midrange driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY: 1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
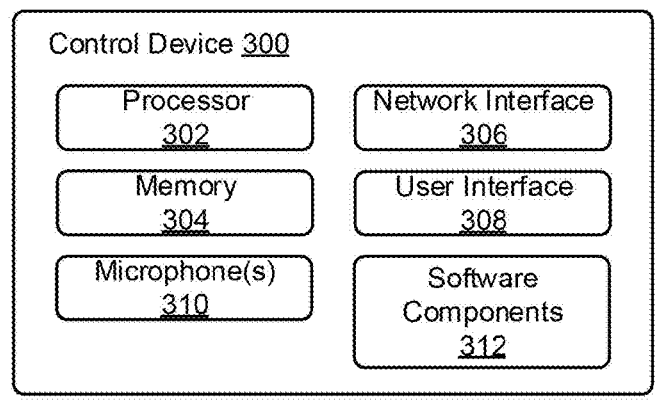
FIG. 3 is a functional block diagram of an example control device according to aspects described herein.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be data storage that can be loaded with one or more of the software components executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
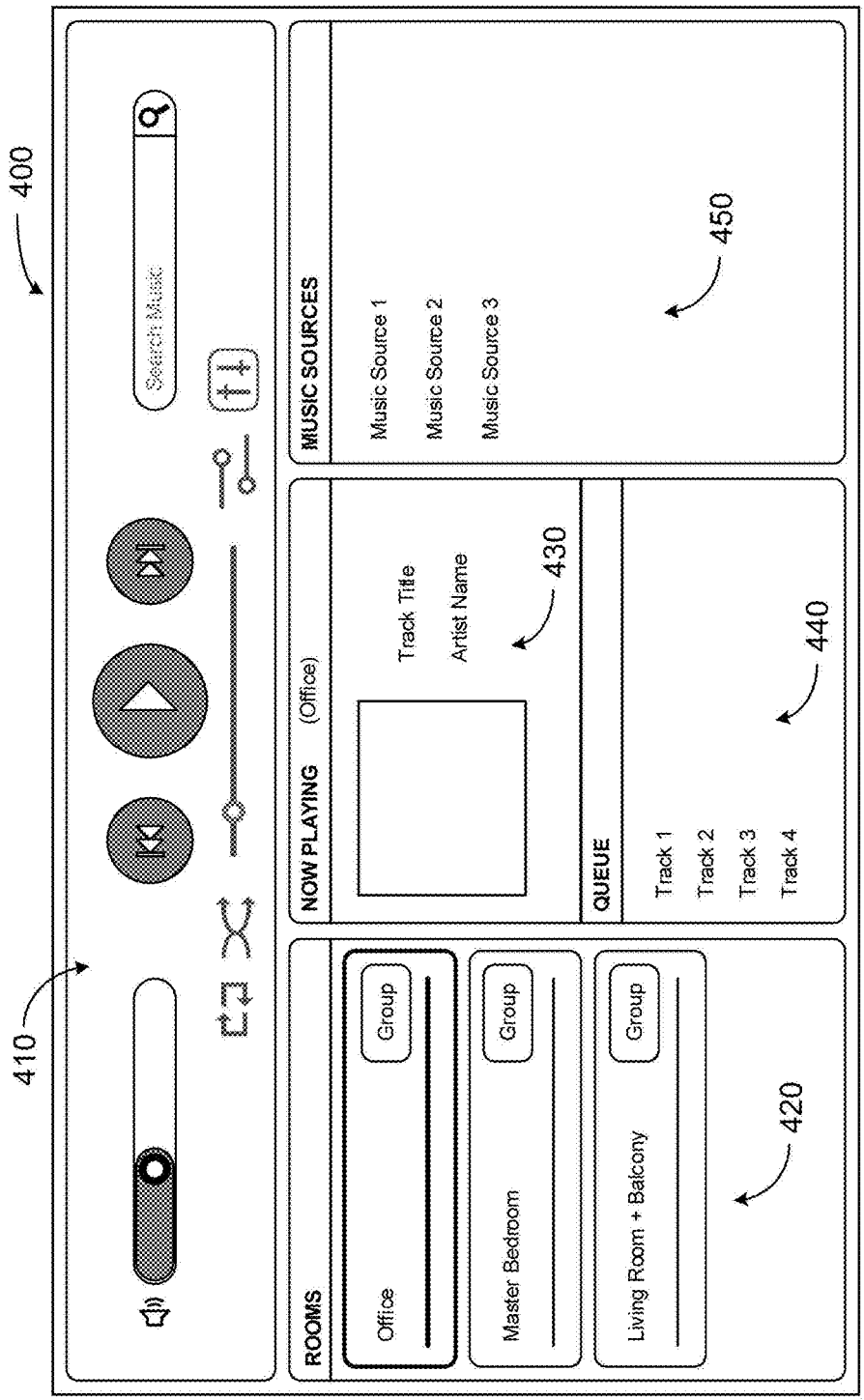
FIG. 4 is an example controller interface according to aspects described herein.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
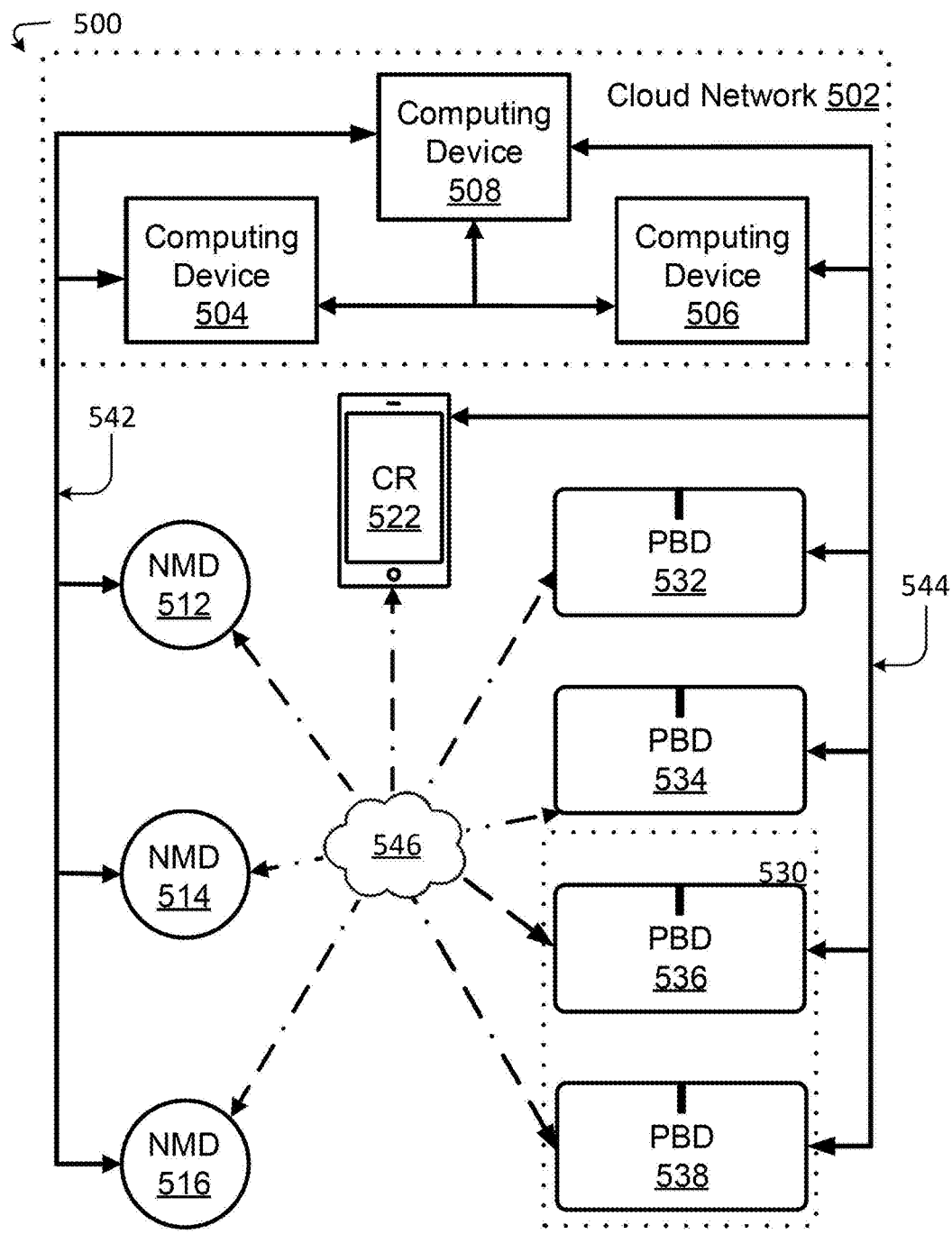
FIG. 5 is a schematic diagram of a plurality of network devices according to aspects described herein.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300. Further, in some cases, one or more of NMDs 512, 514, and 516 may be the playback device 200 or network device 300. In an example, one or more of NMDs 512, 514, and/or 516 may include multiple microphones arranged in a microphone array.

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506. In another example, the computing device 504 may convert the voice input to an equivalent text command, and then subsequently transmit the text command to the computing device 506. The computing device 506 may then parse the text command to identify one or more playback commands.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

In yet another example, the computing device 504 may perform some processing to identify the relevant command or intent of the user and provide information regarding media content relevant to the voice input to the computing device 506. For example, the computing device 504 may perform the speech-to-text conversion of the voice input and analyze the voice input for a command or intent (e.g., play, pause, stop, volume up, volume down, skip, next, group, ungroup) along with other information about how to execute the command. The computing device 504 or the computing device 506 may determine what PBD commands correspond to the command or intent determined by the computing device 504. The command or intent determined from the voice input and/or other information related to executing the command may be transmitted from the computing device 504 to the computing device 506. The processing on the computing device 504 may be performed by an application, a module, add-on software, an integration with the native networked microphone system software platform, and/or the native networked microphone system software platform.

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
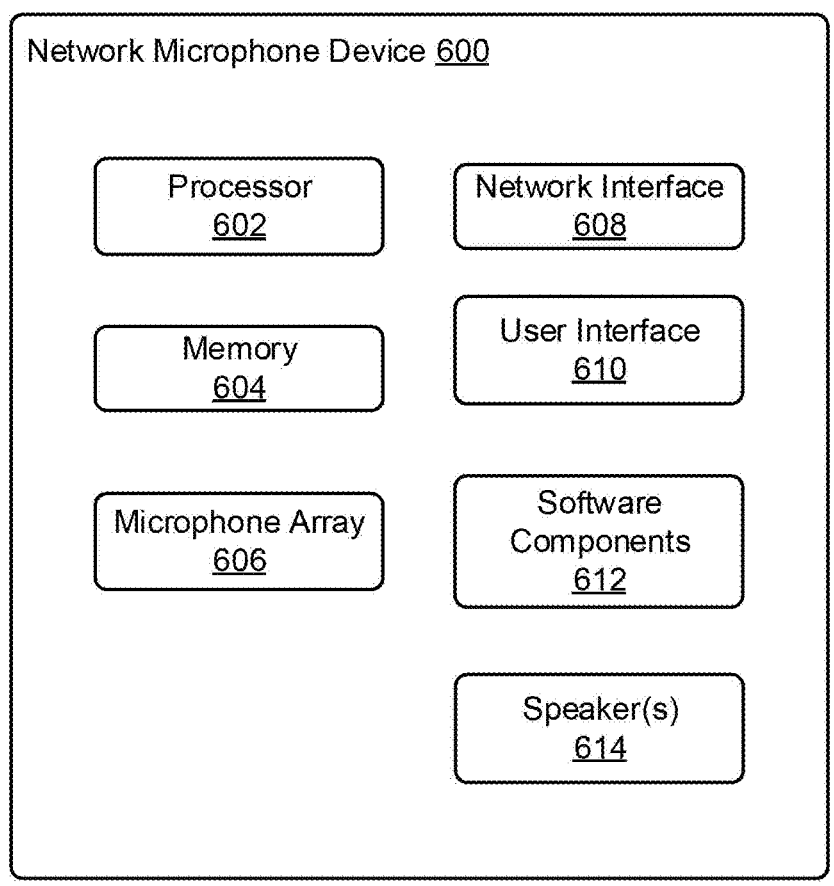
FIG. 6 is a functional block diagram of a network microphone device according to aspects described herein.

FIG. 6 shows a functional block diagram of an example network microphone device 600 that may be configured to be one or more of NMDs 512, 514, and 516 of FIG. 5. As shown, the network microphone device 600 includes a processor 602, memory 604, a microphone array 606, a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The processor 602 may include one or more processors and/or controllers, which may take the form of a general or special-purpose processor or controller. For instance, the processing unit 602 may include microprocessors, microcontrollers, application-specific integrated circuits, digital signal processors, and the like. The memory 604 may be data storage that can be loaded with one or more of the software components executable by the processor 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing device 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example System

Figure 7:
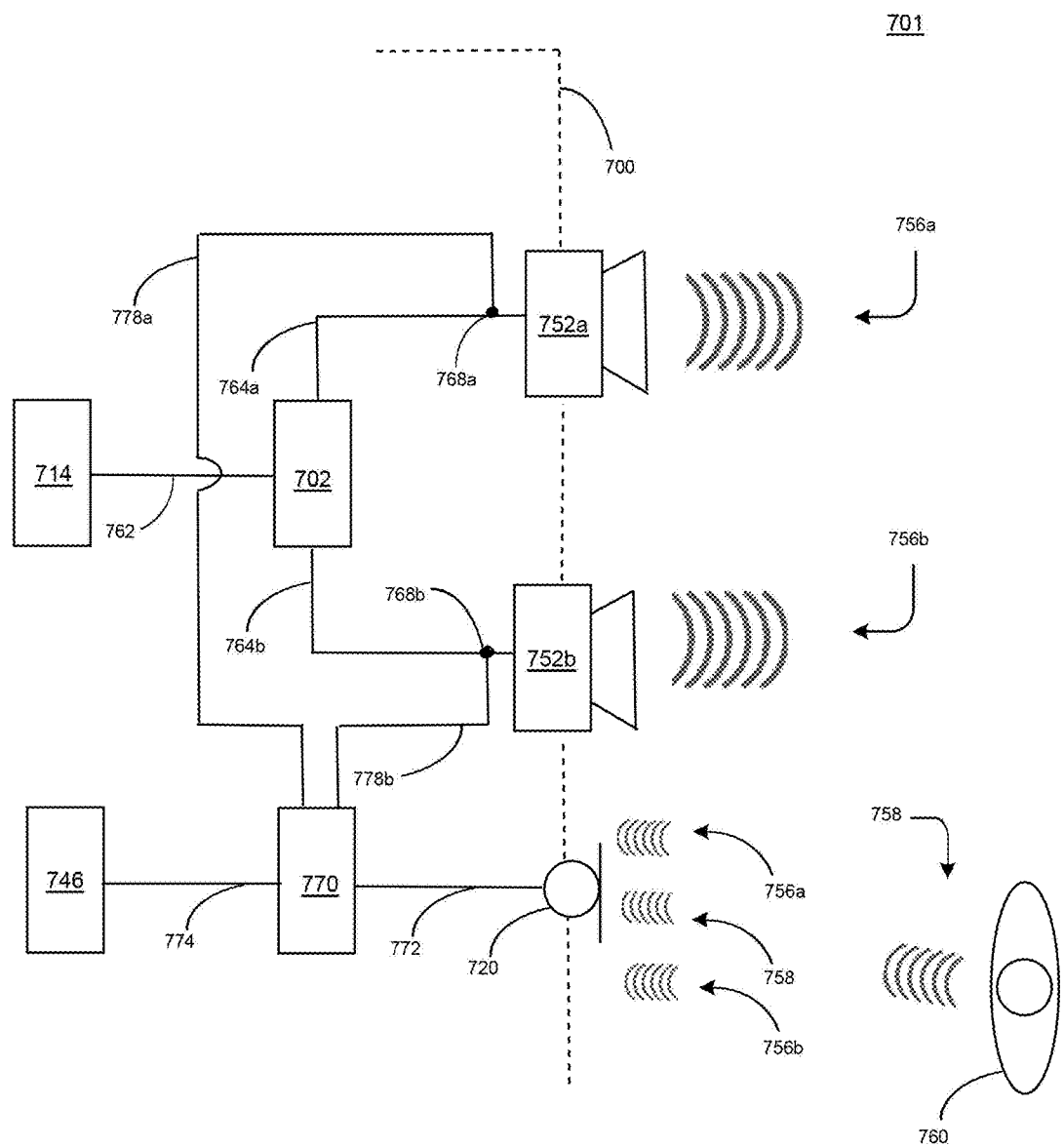
FIG. 7 is a schematic diagram of an example environment in which a playback device may be located.

Embodiments described herein involve performing multi-channel acoustic echo cancellation on a stream of audio captured by at least one microphone of a playback device capable of playing back audio content via a first speaker driver and a second speaker driver. FIG. 7 illustrates such an example environment 701 in which such a playback device may be located in accordance with disclosed embodiments. The example environment 701 may be, for example, a living room or bedroom of a home, and the playback device 700 may be capable of outputting audio content in one or more directions via two or more speakers (e.g., a first speaker driver 752a and a second speaker driver 752b). The audio content may be provided by the computing device 508 via the cloud network 502. For example, the computing device may be a music service provider such as Spotify, Amazon Music, Pandora, among others, and the cloud network may be a wide area network (WAN) such as the Internet.

Figure 8:
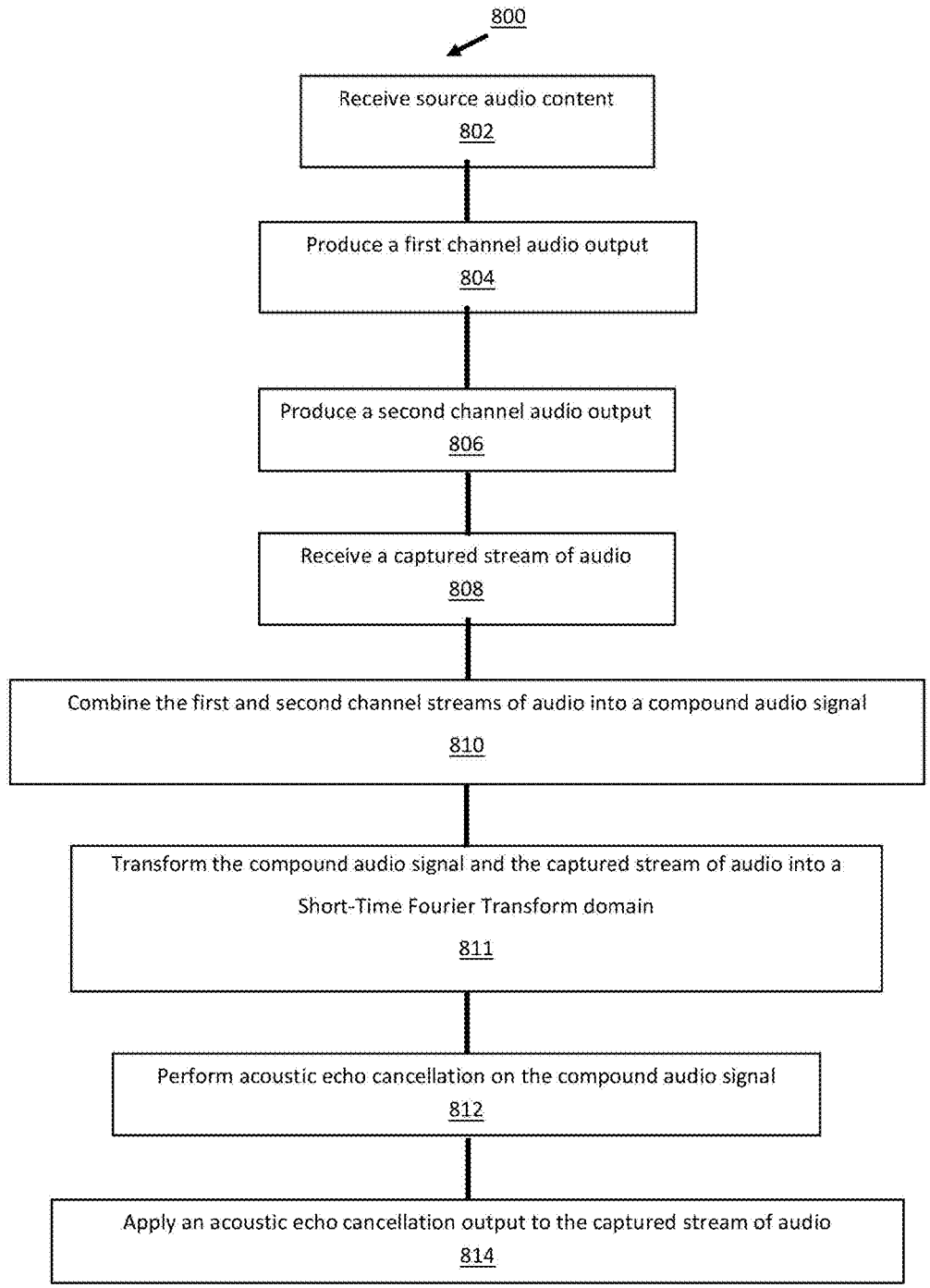
FIG. 8 is a flow diagram of a method of operating a playback device according to aspects described herein.

The playback device 700 has one or more microphones 720 configured to capture and/or record audio. The one or more microphones 720 may be proximate the playback device 700. For example, the microphone 720 may be co-located physically on and/or in the playback device 700, or wired or wirelessly connected to the playback device 700. In some embodiments, a microphone (not shown) may be located remote from the playback device 700 in the room 700. For example, the microphone may be located on, for example, a network device that may be a controller device, NMD, or another audio playback device. In some embodiments, the audio recorded at the audio playback device 700 (or at the network device) may include source audio content and may be used to determine an estimated frequency response of the playback device (i.e., a self-response), and the self-response may be used to calibrate the audio playback device.

a. Example of Performing Acoustic Echo Cancellation Using a Compound Audio Signal FIG. 8 is a flow diagram of a method 800 of performing multi-channel acoustic echo cancellation in accordance with a disclosed embodiment. Methods and the other process disclosed herein may include one or more operations, functions, or actions. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, each block in the figures may represent circuitry that is wired to perform the specific logical functions in the process.

In one example, the playback device 700, which may be identical to the playback device 200, at least partially performs the disclosed functions for multi-channel acoustic echo cancellation. In another example, the computing device 504-508 at least partially performs the disclosed functions for multi-channel acoustic echo cancellation. In yet another example, the controller device 300 performs functions for multi-channel acoustic echo cancellation. In another example, functions for performing multi-channel acoustic echo cancellation may be at least partially performed by one or more NMD 512-516. Other arrangements are also possible.

In the illustrated embodiment of FIG. 8, the method 800 for operating the playback device 700 of FIG. 7 is shown. Briefly, at 802, the playback device 700 receives a source stream of audio. The network interface 714 of the playback device 700 (which corresponds to the network interface 214 of FIG. 2) receives the source stream of audio, and the source stream of audio includes source audio content to be played back by the playback device 700. The source audio content includes a first channel stream of audio and a second channel stream of audio.

At 804, the playback device 200 may play back, via the first speaker driver 752a, the first channel stream of audio, thereby producing a first channel audio output 756a, as illustrated in FIG. 7. At 806, the playback device 200 may play back, via the second speaker driver 752b, the second channel stream of audio, thereby producing a second channel audio output 756b, as illustrated in FIG. 7. At 808, the microphone 720 receives or captures a captured stream of audio from the environment 701 of the playback device 700 and stores data indicative of the captured audio in the captured stream of audio. The captured stream of audio may include a first portion corresponding to the first channel audio output 756a, a second portion corresponding to the second channel audio output 756b, and a third portion corresponding to a vocal command 758 issued by a user 760. The captured stream of audio has a first signal-to-noise ratio.

At 810, the first channel stream of audio and the second channel stream of audio are combined into a compound audio signal. At 811, the compound audio signal and the captured stream of audio is transformed into a Short-Time Fourier Transform domain. At 812, acoustic echo cancellation is performed on the compound audio signal, and performing acoustic echo cancellation on the compound audio signal produces an acoustic echo cancellation output. At

814, the acoustic echo cancellation output is applied to the captured stream of audio, thereby increasing the signal-to noise ratio of the captured stream of audio from the first signal-to-noise ratio to a second signal-to-noise ratio, and the second signal-to-noise ratio is greater than the first signal-to-noise ratio.

Starting at 802, the network interface 214 receives the source of stream of audio via a wireless connection, a wired connection, and/or another suitable means of transmission. The source stream of audio may include or correspond to source audio content to be played back by the playback device 200. In the embodiment of FIG. 7, one or more communication links 762 connects the network interface 214 to one or more processors 702 of the playback device 200, and the one or more communication links 762 provides the source stream of audio to the one or more processors 702. The source stream of audio may include or may be partitioned into any number of suitable channel streams of audio to play back the source audio content on the playback device 200. In the embodiment of FIG. 7, the source stream of audio may include a first channel stream of audio and a second channel stream of audio. One or more first channel communication links 764a connects the one or more processors 702 of the playback device 200 to the first speaker driver 752a, and the one or more first channel communication links 764a provides the first channel stream of audio to the first speaker driver 752a. In addition, one or more second channel communication links 764b connects the one or more processors 702 of the playback device 700 to the second speaker driver 752b, and the one or more second channel communication links 764b provides the second channel stream of audio to the second speaker driver 752b. In other embodiments, the source audio content may further include a third channel stream of audio and/or additional (e.g., a fourth, a fifth) streams of audio, and one or more corresponding channel communication links may connect the one or more processors 702 of the playback device 700 to the corresponding speaker driver. The one or more communication links 762, 764a, 764b may take the form of traces on a printed circuit board. For example, if the playback device 200 includes two speakers (or speaker drivers), a first transducer or speaker driver 752a (e.g., a right speaker) can be configured to play back the first channel stream of audio and a second transducer or speaker driver 752b (e.g., a left speaker) can be configured to play back the second channel stream of audio. Thus, in this example configuration, the first and second speaker drivers 752a, 752b may cooperate to play back the source audio content in two-channel stereo sound. As another example, if the playback device 700 includes three speakers, the first speaker driver 752a (e.g., a right speaker) of the playback device 700 may play back (or may be configured to play back) the first channel stream of audio, the second speaker driver 752b (e.g., a left speaker) of the playback device 700 may play back (or may be configured to play back) the second channel stream of audio, and the third speaker driver (e.g., a center speaker, a midrange speaker, a woofer) of the playback device 700 may play back (or may be configured to play back) the third channel stream of audio. In a further example configuration, a first speaker driver 752a (e.g., a center speaker) of the playback device 700 may play back (or may be configured to play back) the first channel stream of audio, the second speaker driver 752b (e.g., a right speaker) of the playback device 700 may play back (or may be configured to play back) the second channel stream of audio, and the third speaker driver 752c (e.g., a left speaker) of the playback device 700 may play back (or may be configured to play back) the third channel stream of audio. In these example configurations, the first, second, and third speaker drivers may cooperate to play back the source audio content in three-channel stereo sound. Any number of additional speakers and corresponding additional streams of audio comprising source audio content are contemplated.

The source stream of audio (and/or the first channel stream of audio, the second channel stream of audio, the third channel stream of audio, and any other additional channel stream of audio associated with the steam of audio) may be segmented into one or more chunks of data. For example, the chunks may take the form of packets of digital samples of audio content. These chunks of data may be stored on the playback device 700 performing the multi-channel acoustic echo cancellation and/or stored on a computing device associated with the multi-channel acoustic echo cancellation.

Figure 9:
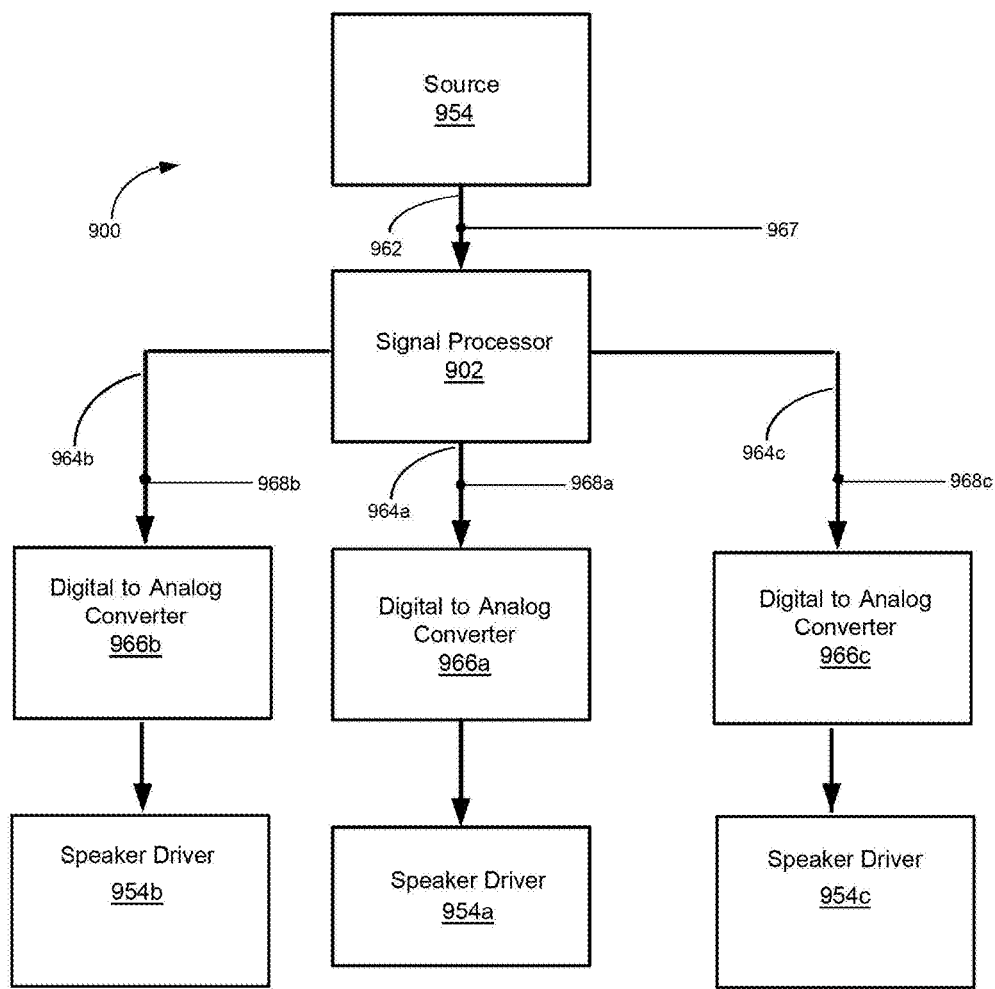
FIG. 9 is a block diagram of an audio pipeline of a playback device.

FIG. 9 is a block diagram of an audio pipeline 900 configured to receive or play back a source stream of audio. The audio pipeline 900 includes a source 954 and a signal processor 902, which may be any signal processor associated with the playback device 700, such as the processor 702. A first digital to analog converter 966a and a first speaker driver 952a are coupled to the signal processor 902 via one or more communication links 964a. The one or more communication links 964a may correspond to all or part of the first channel communication link 764a of FIG. 7 and the first speaker driver 952a may correspond to the first speaker driver 752a of FIG. 7. A second digital to analog converter 966b and a second speaker driver 952b are coupled to the signal processor 902 (and/or another signal processor (not shown)) via one or more communication links 964b, and the one or more communication links 964a may correspond to all or part of the second channel communication link 764b of FIG. 7 and the second speaker driver 952b may correspond to the second speaker driver 752b of FIG. 7. In the illustrated embodiment, a third digital to analog converter 966c and a third speaker driver 952c are coupled to the signal processor 902 (and/or another signal processor) via one or more communication links 964c. In some embodiments, however, fewer or additional digital to analog converters and associated speaker drivers may be coupled to the signal processor 902 (and/or another signal processor) via one or more communication links.

As illustrated in FIG. 9, the audio pipeline 900 is disposed on or incorporated into the playback device 700. However, the audio pipeline 900 may be disposed on or incorporated into a controller device, computing device, NMD, or a combination thereof. In the case of the audio pipeline 900 residing on the playback device 700, the communication links may take the form of traces on a printed circuit board. In the case of the audio pipeline residing on the combination thereof, the communication links may take the form of a wired or wireless network such as an Ethernet or WiFi network. In some embodiments, all or portions of the audio pipeline 900 may be disposed on or incorporated into a housing of the playback device.

The source 954 may be a storage device such as memory or a hard drive which stores source audio content. Alternatively, the source 954 may be a computing device such as a music service provider which stores and provides the source audio content to the audio playback device. The source audio content may take the form of an audio file of digital samples defining audio content in a time domain. The source 954 may be located on or along one or more communication links 962 (corresponding to communication links 762 of FIG. 7) connecting the network interface 714 to one or more processors 702 of the playback device 700.

The signal processor 902 may apply one or more filtering algorithms to the source audio content prior to the audio playback device outputting an audio signal. The filtering algorithms may vary based one or more of a volume setting of the playback device, previous calibration of the playback device, device orientation, content type, etc. Further, the signal processor 902 may include one or more of a sample rate converter, bit depth converter, and channel up/down mixer. The sample rate converter may change a sample rate of the source audio content. The sample rate may define a number of samples representing the source audio content per unit time. The bit depth converter may change a bit depth of the source audio content signal. The bit depth may be a number of bits used to represent a digital sample. The channel up/down mixer may mix source audio content from different channels such as a left and right channel of stereo sound. The signal processor 902 may perform other functions as well.

In some embodiments, the signal processor 902 may process the source audio content in a digital domain and output a processed digital signal. The first, second, and third digital to analog converters 966a, 966b, 966c may convert the digital signal of the signal processor 902 (e.g., the digital signal of the first channel stream of audio, the second channel stream of audio, and the third channel stream of audio) to an analog signal (e.g., a first channel analog signal, a second channel analog signal, and a third channel analog signal). The analog signal may be output to a corresponding one of the first, second, and/or third speaker drivers 954a, 954b, 954c, which converts the analog signal to audible audio. For example, the audio output may include the first channel audio output 756a (illustrated in FIG. 7) corresponding to the first channel stream of audio being played back by the first speaker driver 954a, the second channel audio output 756b (illustrated in FIG. 7) corresponding to the second channel stream of audio being played back by the second speaker driver 954b, and the third channel audio output corresponding to the third channel stream of audio being played back by the third speaker driver 956c.

The source audio content (e.g., the first channel stream of audio and the second channel stream of audio) that is used in multi-channel acoustic echo cancellation may be received at a tap 967 and/or taps 968a, 968b, 968c of FIG. 9. Each tap 967, 968a-968c may be an end portion of a communication link that extends between the processor performing acoustic echo cancellation (e.g., the processor 770) and a corresponding one of the first, second, or third channel communication link 964a-964c. The tap 968a may be disposed on a portion of the first channel communication link 964a between the signal processor 902 and the first digital to analog converter 966a, and the tap 968a may be disposed as close as possible to the first digital to analog converter 966a. Similarly, the tap 968b may be disposed on a portion of the second channel communication link 964b between the signal processor 902 and the second digital to analog converter 966b, and the tap 968b may be disposed as close as possible to the second digital to analog converter 966b. Additionally, the tap 968c may be disposed on a portion of the third channel communication link 964c between the signal processor 902 and the third digital to analog converter 966c, and the tap 968c may be disposed as close as possible to the third digital to analog converter 966c. In the case that the source audio content is received at the tap 967, then processing that would otherwise be applied by the signal processor 902 may need to be applied to the source stream of audio prior to performing multi-channel acoustic echo cancellation which is discussed below.

As illustrated in the example configuration of FIG. 7, the tap 768a (which corresponds to tap 968a of FIG. 9) is an end portion of a communication link 778a that extends between a portion of the first channel communication link 764a and the processor 770, and the communication link 778a provides the first channel stream of audio to the processor 770 that performs acoustic echo cancellation. Also illustrated in FIG. 7, the tap 768b (which corresponds to tap 968b of FIG. 9) is an end portion of a communication link 778b that extends between a portion of the second channel communication link 764b and the processor 770, and the communication link 778b provides the second channel stream of audio to the processor 770 that performs acoustic echo cancellation. In other embodiments, a tap corresponding to tap 968b of FIG. 9 may be an end portion of a communication link (not shown) that extends between a portion of a third channel communication link (corresponding to communication link 968c of FIG. 9) and the processor 770, and the communication link provides the third channel stream of audio to the processor 770 that performs acoustic echo cancellation. Further communication links may be linked to the processor 770 if further speaker drivers are included in the playback device 700.

At 808, the microphone of the playback device 700 receives captured audio comprising digital signals converted from analog signals by an analog-to-digital converter associated with the microphone. The captured audio may be recorded, captured, and/or stored by the microphone of the playback device 700, network device controller device, NMD, or another audio playback device in any suitable manner. In some embodiments, the microphone 720 may be one of an array of microphones. The captured stream of audio may include any noise or audible event within the detectable frequency range of the microphone. For example, as illustrated in FIG. 7, a user 760 may speak a vocal command 758 that is directed to the playback device 700, and the vocal command 758 is captured by the microphone 720 such that the captured stream of audio includes the vocal command 758 issued to the playback device 200. In some embodiments, particularly in the embodiment of FIG. 7, the vocal command 758 may be issued when the playback device 700 is playing back a source stream of audio. Accordingly, the captured stream of audio may include a portion corresponding to the vocal command 758 and also include a first portion corresponding to the first channel audio output 756a played by the first speaker driver 752a, a second portion corresponding to the second channel audio output 756b played by the second speaker driver 752b, and in some embodiments, a portion corresponding to the third channel audio output played by the third speaker driver. The captured stream of audio may therefore have a first signal to noise ratio.

The first portion, the second portion, the portion corresponding to the third channel audio output, and the portion corresponding to the vocal command 758 of the captured stream of audio may be a time domain representation of the audio content output (e.g., the first channel audio output, the second channel audio output, and the third channel audio output) by the playback device 700. The captured stream of audio may be segmented into one or more chunks of data, e.g., packets. The captured stream of audio may be stored on the playback device 200 or passed to another network device, such as a computing device, another playback device, control device or NMD.

The playback device 700 that is performing the multi-channel acoustic echo cancellation may record or capture all or a portion of the captured stream of audio. The captured stream of audio may be recorded via at least one microphone 720 (e.g., one or more of a microphone array 606) co-located on the playback device 700, or the captured stream of audio may be recorded via one or more microphones in a spatially different location from the playback device. For example, another playback device may record the captured stream of audio, a network device may receive this captured stream of audio, and/or a NMD may record this captured stream of audio. The captured stream of audio may include a signal derived from the captured stream of audio by one or more operations by a processor.

As shown at 810, the first channel stream of audio, the second channel stream of audio (and in some embodiments, the third channel stream of audio) may be combined or mixed into a compound audio signal. For example, the compound audio signal may be the sum of the first channel stream of audio, the second channel stream of audio, and the third channel stream of audio. In some embodiments, the first channel stream of audio, the second channel stream of audio, and the third channel stream of audio may be converted from the time domain to the frequency domain (via a Fourier transform or other known methods) and the compound audio signal may be the sum of the first channel stream of audio, the second channel stream of audio, and the third channel stream of audio in the frequency domain. The compound audio signal may be further processed in the frequency domain or may be transformed into the time domain in any suitable or known manner for further processing.

The first, second, and third channel stream of audio may be combined or mixed into the compound audio signal by a processor disposed on or within a housing of the playback device 700, such as the processor 702 or the audio processing components 208, and/or any other processor component associated with the playback device. Alternatively, the first, second, and third channel stream of audio may be combined or mixed into the compound audio signal by a processor disposed remote from the playback device 200.

At 812, one or more processors associated with the playback device 700 performs acoustic echo cancellation on the compound audio signal, and performing acoustic echo cancellation on the compound audio signal produces or results in an acoustic echo cancellation output. At 814, one or more processors associated with the playback device 200 applies the acoustic echo cancellation output to the captured stream of audio, thereby increasing the signal-to noise ratio of the captured stream of audio from the first signal-to-noise ratio to a second signal-to-noise ratio, wherein the second signal-to-noise ratio is greater than the first signal-to-noise ratio.

The one or more processors that performs acoustic echo cancellation may be the same processor that applies the acoustic echo cancellation output to the captured stream of audio. In the embodiment of FIG. 7, the one or more processors may include processor 770. In other embodiments, the one or more processors may include the processor 702, the audio processing components 208 (illustrated in FIG. 2), and/or any other processor component associated with the playback device 700 or any other device. In some embodiments, the processor that performs acoustic echo cancellation may be different than the processor that applies the acoustic echo cancellation output to the captured stream of audio, and either may be the processor 702 of the processor 770. In the embodiment of FIG. 7, one or more microphone communication links 772 connects the processor 770 of the playback device 700 to the microphone 720, and the one or more microphone communication links 772 provides the captured stream of audio to the processor 770. Thus, the captured stream of audio transmitted via the communication link 772 may have a first signal to noise ratio. In embodiments with two or more microphones, one or more further microphone communication links connects each additional microphone to the processor 770 (or any other processor) of the playback device 700 to provides the captured stream of audio associated with each microphone to the processor 770.

Performing the acoustic echo cancellation to produce an acoustic echo cancellation output and applying the acoustic echo cancellation output to the captured stream of audio may be performed in any manner. Generally speaking, acoustic echo cancellation involves two inputs: (1) a signal recorded by the microphone (here, the captured stream of audio); and (2) a reference signal (or reference signals) typically taken from a point in the audio playback pipeline, such as the example of FIG. 9, that most closely represents the analog audio expected to be output by the speakers (here, the compound audio signal). The acoustic echo cancellation then attempts to determine a transfer function (also called a filter) that transforms the reference signal into the recorded microphone signal with minimal error. Inverting the resulting output of the acoustic echo cancellation and mixing it with the signal recorded by the microphone causes a redaction of the reference signal from the signal recorded by the microphone. Thus, the "signal" of a user's voice input (the vocal command 758) remains in the processed captured stream of audio, and the "noise" of the audio output (the first channel audio output 756*a* and the second channel audio output 756*b*) from the speakers of the playback device 700 is reduced or removed. That is, after applying the acoustic echo cancellation output to the captured stream of audio to result in the second signal-to-noise ratio, the second signal-to-noise ratio will be greater than the first signal-to-noise ratio associated with the captured stream of audio prior to the application of the acoustic echo cancellation output.

Applying the transfer function to the reference signal can account for factors (e.g., echo in a room, non-linear response of audio output transducers) that could cause the acoustic echo cancellation to become destabilized. In some embodiments, the transfer function may exist for each channel to each microphone (which may be one of an array of microphones) and each speaker driver to each microphone.

To reduce processing requirements, processing associated with acoustic echo cancellation may be performed in the Short-Time Fourier Transform ["STFT"] domain. Thus, at 811, the reference signal (here, the compound audio signal) and the signal recorded by the microphone 720 (here, the captured stream of audio) are transformed into a STFT domain. The compound audio signal and the captured stream of audio may be transformed into a STFT by one or more processors associated with the playback device 700, and the compound audio signal and the captured stream of audio may be transformed into a STFT domain prior to performing acoustic echo cancellation and/or applying the acoustic echo cancellation output to the captured stream of audio.

In addition, the acoustic echo cancellation algorithm may include or involve one or more adaptive cross-band filters that involve optimized sub-processes that further reduce computational complexity. The cross-band filters eliminate the need for convolution of a Fast Fourier Transform algorithm, which achieves an accurate response while conserving processing power.

Turning to acoustic echo cancellation in more detail, the reference signal (here, the compound audio signal) may be in the frequency domain, and the signal captured or recorded by the microphone 720 (here, the captured stream of audio) may be converted from the time domain to the frequency domain using a Fourier transform, for example. The compound audio signal and the captured stream of audio may be each represented as a vector of data with a magnitude and phase in the frequency domain. A transfer function may be a difference between the compound audio signal vector (S) and the captured stream of audio vector (M).

This transfer function may be calculated based on an adaptive echo cancellation algorithm. The characteristic equation for adaptive echo cancellation may be represented as:

$$M=[S*H+X] \quad (1)$$

where M is a complex vector in the frequency domain representing a magnitude and phase of the captured stream of audio;

S is a complex vector in the frequency domain representing a magnitude and phase of the compound audio signal vector;

H is a complex transfer function in the frequency domain representing a difference between the S and M in the absence of any recorded interference in M; and X represents the recorded interference, e.g., static noise (e.g., buzz) or background noise (e.g., speech) in M. If there is no recorded interference in M, then M=S*X and X=0.

A real part of H, e.g., a magnitude component of the S to M transfer function may be calculated as:

$$\text{mag}H_n = (\text{mag}S_n - \text{mag}M_n)a_n + (1-a_n)(\text{mag}H_{n-1}) \quad (2)$$

where a is a signal to interference ratio, e.g., the signal may be S and the interference may be the recorded interference X. a may be represented as a function of a logarithmic value normalized between 0 and 1;

$\text{mag}S_n$ is a magnitude component vector of the compound audio signal vector;

$\text{mag}M_n$ is a magnitude component vector of the captured stream of audio vector; and n is an iteration.

With each iteration, a magnitude component vector of the captured stream of audio vector magM, a magnitude component vector of the compound audio signal magS, and the magnitude component of the S to M transfer function magH from one iteration is used to calculate the magnitude component of the S to M transfer function for the next iteration. The following calculation may be performed for each iteration:

$$\text{mag}M_n - \text{mag}S_n * \text{mag}H_n \quad (3)$$

where $\text{mag}M_n$ is a magnitude component vector of the captured stream of audio vector;

$\text{mag}S_n$ is a magnitude component vector of the compound audio signal vector;

$\text{mag}H_n$ is a magnitude component of the S to M transfer function.

As would be understood by one having ordinary skill in the art, the transfer function may converge when a result of this equation is zero or substantially zero, which indicates that the compound audio signal is removed from the captured stream of audio, leaving only a vocal command from a user, and thereby increasing the signal-to-noise ratio in the captured stream of audio. One having ordinary skill in the art would recognize that the result of the equation may alternatively converge within an acceptable range of zero, and such a range would allow for a reduction of the compound audio signal in the captured stream of audio to allow a vocal command from a user to be detected over the "noise" of the audio signal played back by the first and second speaker drivers 752a, 752b.

Accordingly, with reference to the embodiment of FIG. 7, one or more communication links 774 may connect the processor to a further component 776 (which may be the processor 702 or another processor that analyzes the captured steam of audio to determine if a vocal command 758 has been issued by a user 760 and/or to issue a command to the playback device 700 corresponding to the vocal command 758. Applying the acoustic echo cancellation output to the captured stream of audio therefore results in a second signal-to-noise ratio in the one or more communication links 774, the second signal-to-noise ratio being greater than the first signal-to-noise ratio associated with the captured stream of audio prior to the application of the acoustic echo cancellation output (e.g., the captured stream of audio prior transmitted along the one or more communication links 772). Thus, the vocal command 758 of a user remains in the captured stream of audio for processing by the component 776 while the "noise" of the first channel audio output 756a and the second channel audio output 756b is reduced or removed.

The increase in the signal-to-noise ratio may depend on any or all of several factors, such as the play back volume of the first channel audio output 756a and the second channel audio output 756b and on the size, dimension, acoustics, etc. of the room where the playback device 700 is located. In some embodiments, the difference between the second signal-to-noise ratio and the first signal-to-noise ratio may be within the range of 10 db (or approximately 10 dB) to 20 dB (or approximately 20 dB).

By combining the first channel stream of audio and the second channel stream of audio (and, optionally, the third and additional streams of audio) into the compound audio signal, the acoustic echo cancellation process can be performed on only the compound audio signal and not on each of the first, second, and third channel streams of audio. Thus, the acoustic echo cancellation is simplified, thereby realizing a suitably large signal-to-noise ratio using a less-complex algorithm without a costly upgrade to the currently-used playback device CPU.

b. Example of Performing Acoustic Echo Cancellation On Signals in Parallel

Figure 10:
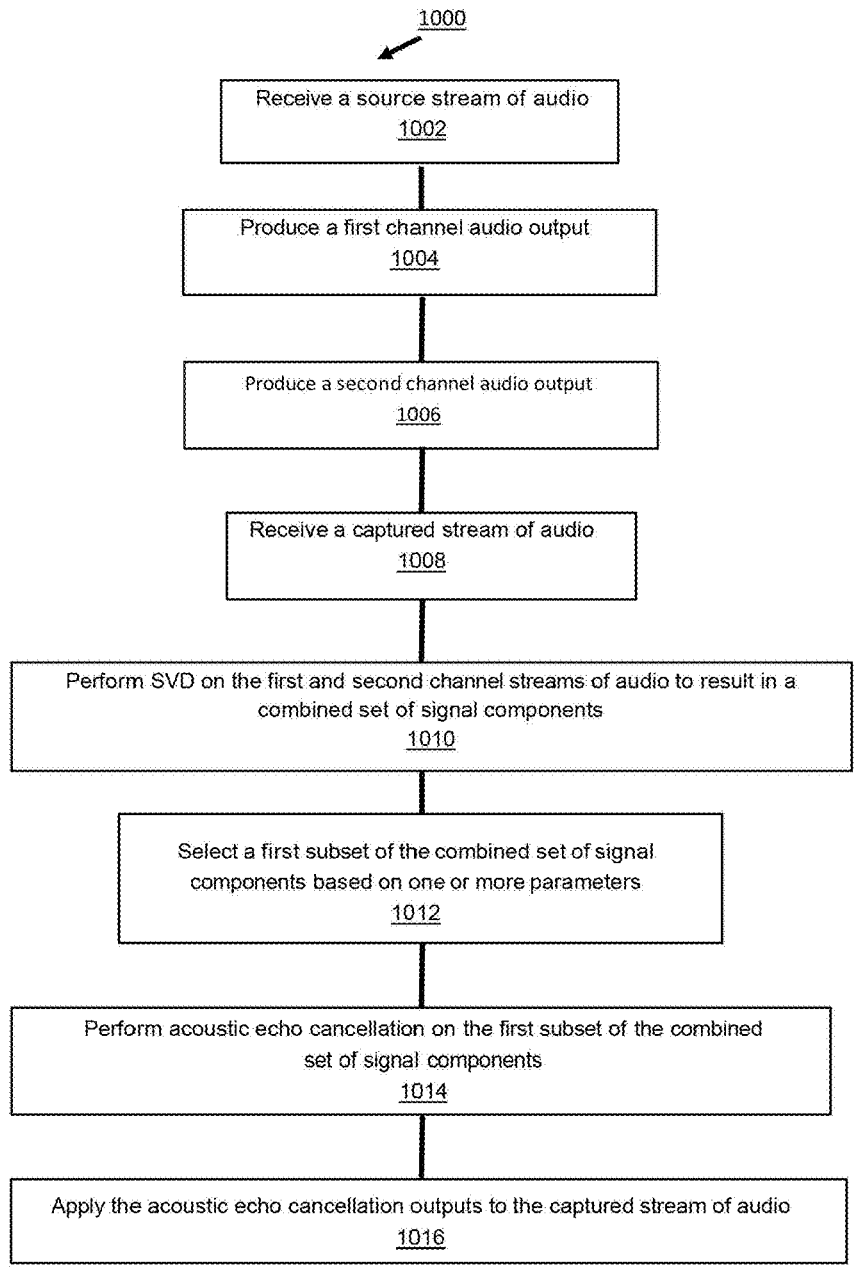
FIG. 10 is a flow diagram of a method of operating a playback device.

In some embodiments, acoustic echo cancellation may be performed on the first and second (and third, etc.) channel streams of audio in parallel. That is, a processor may perform acoustic echo cancellation on the first channel stream of audio to result in a first acoustic echo cancellation output, a processor may perform acoustic echo cancellation on the second channel stream of audio to result in a second acoustic echo cancellation output, and, optionally, a processor may perform acoustic echo cancellation on the third channel stream of audio to result in a third acoustic echo cancellation output. The one or more processors may perform acoustic echo cancellation on the first channel stream of audio in parallel with the second channel stream of audio and, optionally, the third channel stream of audio. The parallel processing may be performed in any known manner. The one or more processors may then apply the first acoustic echo cancellation output, the second acoustic cancellation output, and, optionally, the third acoustic cancellation output to the captured stream of audio, thereby increasing the signal-to noise ratio of the captured stream of audio from the first signal-to-noise ratio to a second signal-to-noise ratio, and the second signal-to-noise ratio is greater than the first signal-to-noise ratio.

c. Example of Performing Acoustic Echo Cancellation Using Singular Value Decomposition In other embodiments, singular value decomposition ("SVD") may be incorporated into the acoustic echo cancellation process to reduce computational complexity while realizing an improved signal-to-noise ratio. An exemplary method 1000 for operating the playback device 700 that incorporates SVD is illustrated in FIG. 10.

At 1002, a playback device 700 (such as the playback device 700 illustrated in FIG. 7) receives a source stream of audio, and the playback device 700 has a first speaker driver 752a, at least a second speaker driver 752b, and at least one microphone 720, as previously described. As previously explained, the playback device 700 may include a third speaker driver and any number of additional speaker drivers. The source stream of audio is received via the network interface 714 of the playback device 700, and the source stream of audio includes source audio content to be played back by the playback device 700, as previously explained. The source audio content includes a first channel stream of audio, a second channel stream of audio, and, optionally, a third channel stream of audio or additional channel streams of audio, as previously explained.

At 1004, the playback device 700 plays back, via the first speaker driver 752a, the first channel stream of audio, thereby producing a first channel audio output 756a, as previously described. At 1006, the playback device 700 plays back, via the second speaker driver 752b, the second channel stream of audio, thereby producing a second channel audio output 756b, as previously described. Also as previously described, the playback device 700 may play back, via the third speaker driver, the third channel stream of audio, thereby producing a third channel audio output. Further speaker drivers of the playback device 200 may playback further channel streams of audio, thereby producing further channel audio outputs.

At 1008, a microphone 720 receives or captures the stream of audio. As previously described, and with reference to the embodiment of FIG. 7, the captured stream of audio is transmitted via the communication link 772 to the processor 770. The captured stream of audio may include a first portion corresponding to the first channel audio output 756a, a second portion corresponding to the second channel audio output 756b, and a portion corresponding to a vocal command 758 issued by a user 760, and the captured stream of audio has a first signal-to-noise ratio. As previously explained, the captured stream of audio may also include a third portion corresponding to the third channel audio output and additional portions corresponding to additional channels of audio output.

At 1010, one or more processors associated with the playback device 700 performs an SVD on the first channel stream of audio, the second channel stream of audio and, optionally, the third channel streams of audio (that is, to a union of the first, second, and third channel streams of audio) to result in a combined set of signal components. In some embodiments, the one or more processors associated with the playback device 700 may perform an SVD on the first channel stream of audio, the second channel stream of audio and, optionally, the third channel streams of audio simultaneously.

In other embodiments, one or more processors associated with the playback device 700 may perform an SVD separately on the first channel stream of audio to result in a first set of signal components and on the second channel stream of audio to result in a second set of signal components. Optionally, one or more processors associated with the playback device 700 may also separately perform an SVD on the third channel stream of audio to result in a third set of signal components and, if appropriate, on additional channel streams of audio to result in corresponding additional sets of signal components.

At 1012, one or more processors associated with the playback device 700 selects or determines a first subset of the combined set of signal components based on one or more parameters. In some embodiments, the one or more processors associated with the playback device 700 may select or determine a second subset (and further subsets) of the combined set of signal components based on one or more parameters.

In other embodiments, one or more processors associated with the playback device 700 may select or determine a subset of the first set of signal components based on one or more parameters, and one or more processors associated with the playback device 700 may select or determine a subset of the second set of signal components based on one or more parameters. Optionally, one or more processors associated with the playback device 700 may select or determine a subset of the third (and additional) set of signal components based on one or more parameters. Any or all of the one or more parameters of the subset of the second set of signal components or the subset of the third (or additional) set of signal components may correspond to any or all of the one or more parameters of the subset of the first set of signal components.

In an SVD, data is represented in a statistical domain rather than in a time or frequency domain, and the data is projected onto a set of axes that are based on a statistical criterion and are therefore not fixed. The representation of the data in SVD effectively separates the data into separate sources to reveal significant structure(s) in the projections. In some examples, performing an SVD on a set of data, such as the first, second, and third channel stream of audio, may reveal indicators (e.g., peaks) at a certain frequency or time, and these indicators may correspond to a strong component (e.g., strong energy content) of the signal at the corresponding frequency or time. Projections that correspond to unwanted sources (e.g., weak energy content) may then be ignored or discarded. The desired data can then be projected back into the original domain or space, thereby reducing the amount of information included in the original data set. As would be appreciated by one having ordinary skill in the art, performing acoustic echo cancellation on the filtered subset of the original data (such as a subset having an energy content above a threshold energy content and/or a calculated variance above a threshold variance) requires less processing resources than performing acoustic echo cancellation on the entire set of the original data.

In an example of how SVD may be performed, the SVD theorem provides:

$$A = USV^T$$

where $$U^T U = I$$

$$V^T V = I \text{ (i.e., } U \text{ and } V \text{ are orthogonal)}$$

A is a M×N matrix that may correspond to or be associated with one of the first channel stream of audio, the second channel stream of audio, and/or the third channel stream of audio (and/or any further channel streams of audio). The rows and columns of A may be associated with the data and the experimental conditions. For example, the data in A may correspond to or include N audio waveforms that may each be M samples long. U is an M×M matrix having columns that are left singular vectors, S is an M×N matrix that has singular values and is diagonal, and $V^T$ has rows that are right singular vectors. The SVD represents an expansion of the original data in a coordinate system where the covariance matrix is diagonal.

Calculating the SVD consists of finding the eigenvalues and eigenvectors of $AA^T$ and $A^TA$. The eigenvectors of $A^TA$ make up the columns of V and the eigenvectors of $AA^T$ make up the columns of U. Also, the singular values in S are square roots of eigenvalues from $AA^T$ or $A^TA$. The singular values are the diagonal entries of S and are arranged in descending order. The singular values are always real numbers. If A is a real matrix, then U and V are also real.

Values of S that are below a threshold value can be ignored or set to 0, and therefore corresponding values in portions of U and V can also be ignored to set to 0. Thus, when projected back into the original domain or space the amount of information included in the data set is reduced, thereby simplifying the acoustic echo cancellation process.

The subsets of the combined set of signal components (or the subsets of the first, second, and third set of signal components) may be selected or determined based on any or all of several parameters. These parameters may correspond to threshold values such that signal components above the threshold value (which correspond to relatively strong or intense components) are selected and included in the corresponding subset. For example, one parameter may be energy content, and signal components having an energy content above a first threshold energy content may be selected for the subset. In some embodiments, one parameter may be variance, and signal components having a calculated variance above a first threshold variance may be selected for the subset. In some embodiments, all signal components having an energy content above a first threshold energy content and a calculated variance above a first threshold variance may be selected for the subset. In some embodiments, any given subset may be selected from any or all of the first, second, or third set of signal components. For example, only the third set of signal components may have signal components having an energy content above the first threshold energy content, and the first and second set of signal components may have signal components having an energy content less than or equal to the first threshold energy content.

Accordingly, in some embodiments, a first subset of the combined set of signal components may have at least one of (a) an energy content above a first threshold energy content or (b) a calculated variance above a first threshold variance may be selected. Additionally, a second subset of the combined set of signal components may have at least one of (a) an energy content above a second threshold energy content or (b) a calculated variance above a second threshold variance. Each of the first and second threshold energy content may be different, and each of the first and second threshold variance may be different.

In other embodiments, a subset of the first set of signal components may have at least one of (a) an energy content above a first threshold energy content or (b) a calculated variance above a first threshold variance may be selected, and a subset of the second set of signal components may have at least one of (a) an energy content above a second threshold energy content or (b) a calculated variance above a second threshold variance. In some embodiments, a subset of the third set of signal components may have at least one of (a) an energy content above a third threshold energy content or (b) a calculated variance above a third threshold variance. Each of the first, second, and third threshold energy content may be identical, or one or more may be unique. In addition, each of the first, second, and third threshold variance may be identical, or one or more may be unique.

At 1014, one or more processors associated with the playback device 700 performs acoustic echo cancellation on the first subset of the combined set of signal components, and performing acoustic echo cancellation on the first subset of the combined set of signal components produces a first acoustic echo cancellation output. In some embodiments, the one or more processors associated with the playback device 700 may also perform acoustic echo cancellation on the second subset of the combined set of signal components. The one or more processors associated with the playback device 700 may perform acoustic echo cancellation on the first subset of the combined set of signal components and the second subset of the combined set of signal components (and any other subsets) simultaneously to produce the first acoustic echo cancellation output. However, the one or more processors associated with the playback device 700 may perform acoustic echo cancellation on the first subset of the combined set of signal components and the second subset of the combined set of signal components (and any other subsets) in any order to produce a first acoustic echo cancellation output, a second acoustic echo cancellation output, and further acoustic echo cancellation outputs.

In some embodiments, one or more processors associated with the playback device 700 performs acoustic echo cancellation on the subset of the first set of signal components, and performing acoustic echo cancellation on the subset of the first set of signal produces a first acoustic echo cancellation output. In addition, one or more processors associated with the playback device 700 performs acoustic echo cancellation on the subset of the second set of signal components, and performing acoustic echo cancellation on the subset of the second subset of signal produces a second acoustic echo cancellation output. In addition, one or more processors associated with the playback device 700 may perform acoustic echo cancellation on the subset of the third set of signal components, and performing acoustic echo cancellation on the subset of the third subset of signal components produces a third acoustic echo cancellation output. Further, one or more processors associated with the playback device 700 may perform acoustic echo cancellation on a subset of further sets of signal components, and performing acoustic echo cancellation on the subset of the further subsets of signal produces further acoustic echo cancellation outputs. As previously explained, the processor 770 may perform acoustic echo cancellation on any or all of the subset of the first set of signal components, the subset of the second set of signal components, and the subset of the third set of signal components.

At 1016, one or more processors associated with the playback device 700 apply the first acoustic echo cancellation output to the captured stream of audio, thereby increasing the signal-to noise ratio of the captured stream of audio from the first signal-to-noise ratio to a second signal-to-noise ratio, wherein the second signal-to-noise ratio is greater than the first signal-to-noise ratio. In some embodiments, one or more processors associated with the playback device 700 may apply the first acoustic echo cancellation output to the recorded stream of audio, the second acoustic echo cancellation output to the captured stream of audio, and, optionally, the third acoustic echo cancellation output to the captured stream of audio, thereby increasing the signal-to noise ratio of the captured stream of audio from the first signal-to-noise ratio to the second signal-to-noise ratio. In other embodiments, one or more processors associated with the playback device 700 may further apply the additional echo cancellation output to the recorded stream of audio to increase the signal-to noise ratio of the captured stream of audio from the first signal-to-noise ratio to the second signal-to-noise ratio.

The one or more processors associated with the playback device 700 may apply the first acoustic echo cancellation output (and optionally, the second acoustic echo cancellation output and the third (and additional) acoustic echo cancellation outputs) to the recorded stream of audio in any suitable manner, such as the manner described in relation to the compound audio signal previously described. In some embodiments, two or more of the first acoustic echo cancellation output, the second acoustic echo cancellation output, and the third (and additional) acoustic echo cancellation outputs may be simultaneously applied to the recorded stream of audio. In other examples, the first acoustic echo cancellation output, the second acoustic echo cancellation output, and, optionally, the third (and additional) acoustic echo cancellation outputs may be applied to the recorded stream of audio in parallel, in series, or in any combination thereof.

As previously explained, the one or more processors that performs acoustic echo cancellation may be the same processor that applies the acoustic echo cancellation output to the captured stream of audio. In some embodiments, the one or more processors may include the processor 770, the processor 702, the audio processing components 208 (illustrated in FIG. 2), and/or any other processor component associated with the playback device 700 or any other device. In some embodiments, one or more of the processors that performs acoustic echo cancellation may be different than one or more of the processors that applies the acoustic echo cancellation output to the captured stream of audio.

The acoustic echo cancellation may be performed, for example, according to one or more embodiments of the disclosed technology. The one or more processors 770 associated with the playback device 700 may apply the first acoustic echo cancellation output (and the second acoustic echo cancellation output and the third acoustic echo cancellation outputs) to the captured stream of audio to increase the signal-to noise ratio of the captured stream of audio from the first signal-to-noise ratio to the second signal-to-noise ratio. That is, with reference to the embodiment of FIG. 7, applying the first and second (and further) acoustic echo cancellation outputs to the captured stream of audio results in a second signal-to-noise ratio in the one or more communication links 774, and the second signal-to-noise ratio is greater than the first signal-to-noise ratio associated with the captured stream of audio prior to the application of the acoustic echo cancellation output (e.g., in the one or more communication links 772). Accordingly, Thus, the vocal command 758 of a user remains in the captured stream of audio for processing by the component 776 while the "noise" of the first channel audio output 756*a* and the second channel audio output 756*b* is reduced or removed.

To reduce processing requirements, processing associated with acoustic echo cancellation may be performed in the Short-Time Fourier Transform ["STFT"] domain. That is, the subset of the combined set of signal components and the captured stream of audio (and or any other signals associated with acoustic echo cancellation) may be transformed into a STFT domain. In some embodiments, the subset of the first set of signal components, the subset of the second set of signal components, the subset of the third set of signal components, and the captured stream of audio (and or any other signals associated with acoustic echo cancellation) may be transformed into a STFT domain. In addition, the adaptive cross-band filter may be used in the acoustic echo cancellation operation on any suitable set of signals. Further, the filter applied during application of the first and second (and, optionally, third) acoustic echo cancellation output to the captured stream of audio may be a compound filter comprising combined transfer functions for each channel to each microphone (which may be one of an array of microphones) and/or each speaker driver to each microphone.

Thus, by performing an SVD on the first, second, and third channel streams of audio, and by selecting a subset of the signal components based on the SVD, the most relevant signal components can be identified and the least significant signal components can be discarded. This greatly simplifies the acoustic echo cancellation operation relative to performing acoustic echo cancellation on each of the first, second, and third channel streams of audio. Thus, existing playback device CPUs can be used for the acoustic echo cancellation operation to achieve a satisfactory increase in the signal-to noise ratio of the captured stream of audio, and the increase in the signal-to-noise ratio may be within a range (or over a threshold value) that allows a vocal command 758 from a user 760 to be detected over the "noise" of the audio signal played back by the first and second speaker drivers 752*a*, 752*b*. In some examples, (and depending on the play back volume of the of the first and second channel audio outputs 756*a*, 756*b* and/or on the size, dimension, acoustics, etc. of the room where the playback device 700 is located) the difference between the second signal-to-noise ratio and the first signal-to-noise ratio may be within the range of 10 db (or approximately 10 dB) to 20 dB (or approximately 20 dB). Accordingly, the performance of the voice control associated with the playback device 700 may be improved without incurring the cost of a more powerful CPU.

d. Example of Performing Acoustic Echo Cancellation Using a Reference Channel

Figure 11:
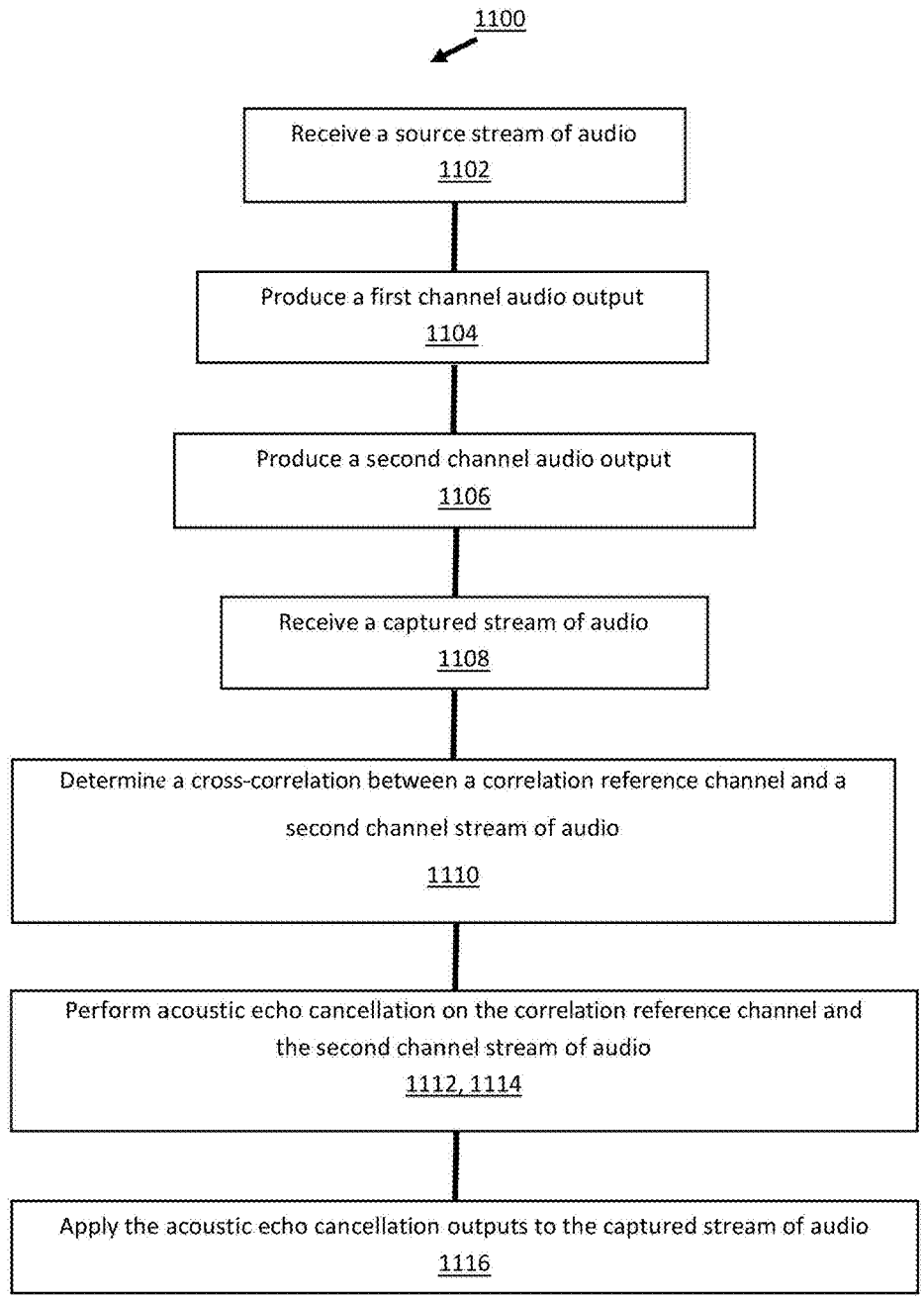
FIG. 11 is a flow diagram of a method of operating a playback device.

In other embodiments, a correlation reference channel may be incorporated into the acoustic echo cancellation process, and an exemplary method 1100 for operating the playback device 700 that incorporates a correlation reference channel is illustrated in FIG. 11. At 1102, the playback device 700 receives a source stream of audio, and the playback device has a first speaker driver 752*a*, at least a second speaker driver 752*b*, and at least one microphone 720, as previously described. As previously explained, the playback device 700 may include a third speaker driver and any number of additional speaker drivers. The source stream of audio is received via the network interface 714 of the playback device 700, and the source stream of audio includes source audio content to be played back by the playback device 700, as previously explained. The source audio content includes a first channel stream of audio, a second channel stream of audio, and, optionally, a third channel stream of audio or additional channel streams of audio, as previously explained. In some embodiments, the first channel stream of audio may be a correlation reference channel. However, in other embodiments, any of the second channel stream of audio, the third channel stream of audio, or further streams of audio may be the correlation reference channel.

At 1104, the playback device 700 plays back, via the first speaker driver 752*a*, the first channel stream of audio, thereby producing a first channel audio output 756*a*, as previously described. At 1106, the playback device 700 plays back, via the second speaker driver 752*b*, the second channel stream of audio, thereby producing a second channel audio output 756*b*, as previously described. Also as previously described, the playback device 700 may play back, via the third speaker driver, the third channel stream of audio, thereby producing a third channel audio output. Further speaker drivers of the playback device 700 may playback further channel streams of audio, thereby producing further channel audio outputs.

At 1108, a microphone 720 receives or captures the stream of audio. As previously described, the captured stream of audio may be transmitted via the communication link 772 to a processor 770. The captured stream of audio includes a first portion corresponding to the first channel audio output 756*a* and a second portion corresponding to the second channel audio output 756*b*, and a portion corresponding to a vocal command 758 issued by a user 760, and the captured stream of audio has a first signal-to-noise ratio. As previously explained, the captured stream of audio may also include a third portion corresponding to the third channel audio output and additional portions corresponding to additional channels of audio output.

At 1110, a cross-correlation between the correlation reference channel and the second channel stream of audio is determined to result in a correlated second channel signal, and the correlated second channel signal is a unique portion of the second channel stream of audio relative to the correlation reference channel. Thus, only signals unique to the second channel stream of audio (relative to the correlation reference channel) are included in the correlated second channel signal.

In some embodiments, a cross-correlation between the correlation reference channel and the third channel stream of audio is determined to result in a correlated third channel signal, and the correlated third channel signal is a unique portion of the third channel stream of audio relative to the correlation reference channel. Thus, only signals unique to the third channel stream of audio (relative to the correlation reference channel) are included in the correlated third channel signal. A cross-correlation between the correlation reference channel and any additional channel streams of audio may be determined to result in further correlated channel signals.

If the correlation reference channel is the second channel stream of audio, a cross-correlation between the correlation reference channel and the first channel stream of audio is determined to result in the correlated second channel signal. A cross-correlation between the correlation reference channel and the third channel stream of audio is determined to result in a correlated third channel signal, and the correlated third channel signal is a unique portion of the third channel stream of audio relative to the correlation reference channel. Similarly, if the correlation reference channel is the third channel stream of audio, a cross-correlation between the correlation reference channel and the first channel stream of audio is determined to result in the correlated second channel signal and a cross-correlation between the correlation reference channel and the second channel stream of audio is determined to result in the correlated third channel signal.

The cross-correlations may be performed in any manner, and any or all of the cross-correlations may be performed by a processor disposed on or within a housing of the playback device 700, such as the processor 702, the processor 770, the audio processing components 208 (illustrated in FIG. 2), and/or any other processor component associated with the playback device 700. Alternatively, any or all of the cross-correlations may be performed by a processor disposed remote from the playback device 700.

At 1112, one or more processors associated with the playback device 700 performs acoustic echo cancellation on the correlation reference channel, and performing acoustic echo cancellation on the correlation reference channel produces a first acoustic echo cancellation output. At 1114, one or more processors associated with the playback device 700 performs acoustic echo cancellation on the correlated second channel signal, and performing acoustic echo cancellation on the correlated second channel signal produces a second acoustic echo cancellation output. In addition, one or more processors associated with the playback device 700 may perform acoustic echo cancellation on the correlated third channel signal, and performing acoustic echo cancellation on the correlated third channel signal produces a third acoustic echo cancellation output. One or more processors associated with the playback device 700 may perform acoustic echo cancellation on the additional correlated channel signals, and performing acoustic echo cancellation on the additional correlated channel signal may produce additional acoustic echo cancellation outputs. As previously explained, the processor 770 may perform acoustic echo cancellation on any or all of the correlation reference channel, correlated second channel signal, and the correlated third channel signal.

At 1116, one or more processors associated with the playback device 700 apply the first acoustic echo cancellation output to the recorded stream of audio and apply the second acoustic echo cancellation output to the captured stream of audio, thereby increasing the signal-to noise ratio of the captured stream of audio from the first signal-to-noise ratio to a second signal-to-noise ratio, and the second signal-to-noise ratio is greater than the first signal-to-noise ratio.

In some embodiments, one or more processors associated with the playback device 700 may apply the first acoustic echo cancellation output to the recorded stream of audio, the second acoustic echo cancellation output to the captured stream of audio, and the third acoustic echo cancellation output to the captured stream of audio, thereby increasing the signal-to noise ratio of the captured stream of audio from the first signal-to-noise ratio to the second signal-to-noise ratio. In other embodiments, one or more processors associated with the playback device 700 may further apply the additional echo cancellation output to the recorded stream of audio to increase the signal-to noise ratio of the captured stream of audio from the first signal-to-noise ratio to the second signal-to-noise ratio.

The one or more processors associated with the playback device 700 may apply the first acoustic echo cancellation output, the second acoustic echo cancellation output, and optionally, the third (and additional) acoustic echo cancellation outputs to the recorded stream of audio in any manner. For example, two or more of the first acoustic echo cancellation output, the second acoustic echo cancellation output, and optionally, the third (and additional) acoustic echo cancellation outputs may be simultaneously applied to the recorded stream of audio. In other examples, the first acoustic echo cancellation output, the second acoustic echo cancellation output, and optionally, the third (and additional) acoustic echo cancellation outputs may be applied to the recorded stream of audio in parallel, in series, or in any combination thereof.

As previously explained, the one or more processors that performs acoustic echo cancellation may be the same processor that applies the acoustic echo cancellation output to the captured stream of audio. In some embodiments, the one or more processors may include the processor 770, the processor 702, the audio processing components 208 (illustrated in FIG. 2), and/or any other processor component associated with the playback device 700 or any other device. In some embodiments, one or more of the processors that performs acoustic echo cancellation may be different than one or more of the processors that applies the acoustic echo cancellation output to the captured stream of audio.

The acoustic echo cancellation may be performed, for example, according to one or more embodiments of the disclosed technology. In addition, the one or more processors associated with the playback device 700 may apply the first acoustic echo cancellation output, the second acoustic echo cancellation output, and optionally, the third (and additional) acoustic echo cancellation outputs to the captured stream of audio in any known manner to increase the signal-to noise ratio of the captured stream of audio from the first signal-to-noise ratio to the second signal-to-noise ratio. That is, with reference to the embodiment of FIG. 7, applying the first and second (and further) acoustic echo cancellation outputs to the captured stream of audio results in a second signal-to-noise ratio in the one or more communication links 774, and the second signal-to-noise ratio is greater than the first signal-to-noise ratio associated with the captured stream of audio prior to the application of the acoustic echo cancellation output (e.g., in the one or more communication links 772). Accordingly, the vocal command 758 of a user remains in the captured stream of audio for processing by the component 776 while the "noise" of the first channel audio output 756a and the second channel audio output 756b is reduced or removed.

As previously described, processing associated with acoustic echo cancellation may be performed in the Short-Time Fourier Transform ["STFT"] domain. That is, the correlation reference channel, the correlated second channel signal, the correlated third channel signal, and the captured stream of audio (and or any other signals associated with acoustic echo cancellation) may be transformed into a STFT domain. In addition, the adaptive cross-band filter may be used in the acoustic echo cancellation operation on any suitable set of signals. Further, the filter applied during application of the first and second (and, optionally, third) acoustic echo cancellation output to the captured stream of audio may be a compound filter comprising combined transfer functions for each channel to each microphone (which may be one of an array of microphones) and/or each speaker driver to each microphone.

Thus, by determining the cross-correlation between the correlation reference channel and the second channel stream of audio and a cross-correlation between the correlation reference channel and the third channel stream of audio, the computational complexity of the acoustic echo cancellation operation can be reduced relative to performing acoustic echo cancellation on each of the first channel stream of audio, the second channel stream of audio, and the third channel stream of audio. Thus, existing playback device CPUs can be used for the acoustic echo cancellation operation to achieve a satisfactory increase in the signal-to noise ratio of the captured stream of audio (e.g., an increase within the range of 10 db to 20 dB), thereby improving the performance of the voice control associated with the playback device 700 without incurring the cost of a more powerful CPU.

e. Example of Performing Acoustic Echo Cancellation Using Cross-Correlation

Figure 12:
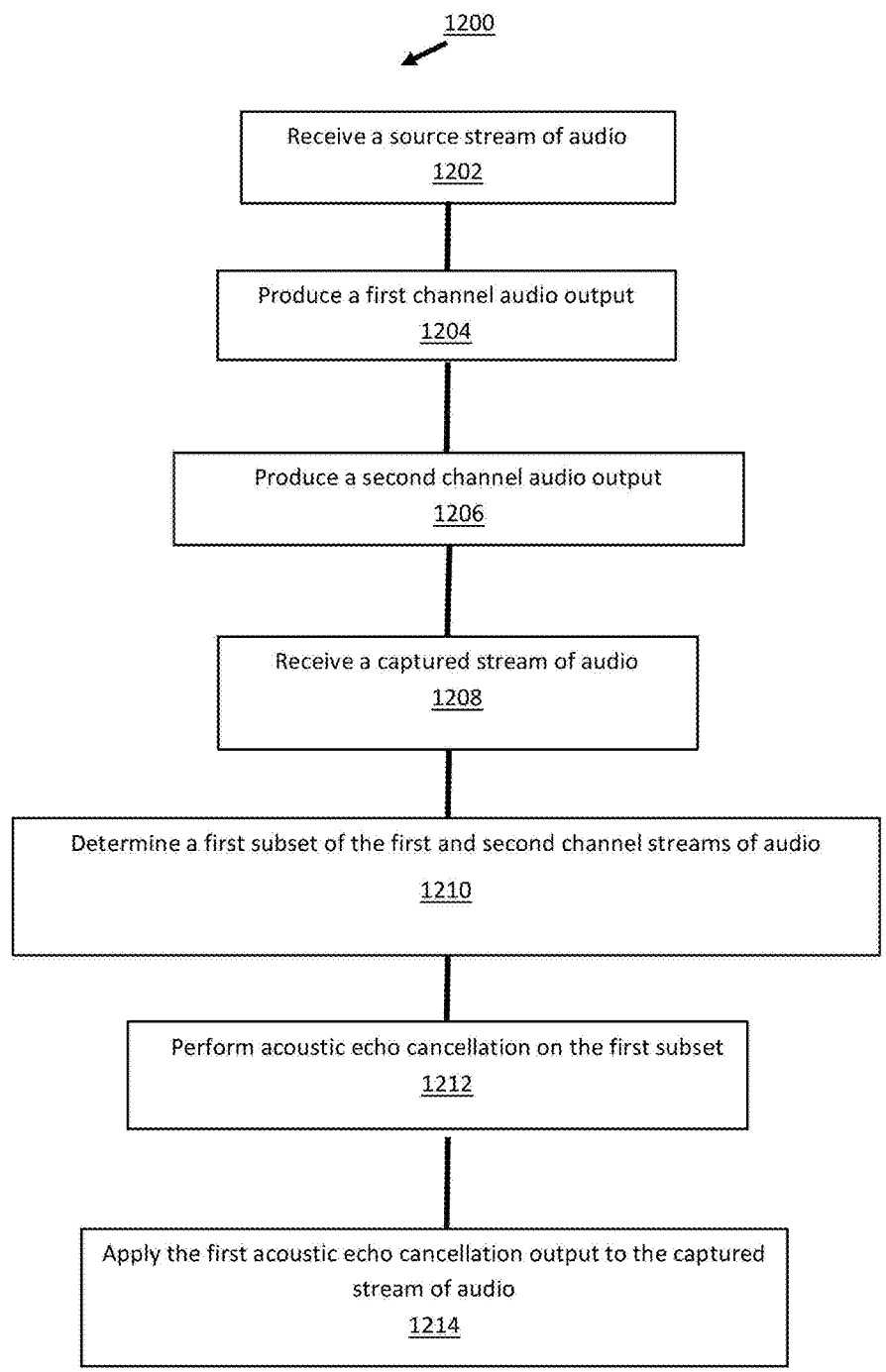
FIG. 12 is a flow diagram of a method of operating a playback device.

In other embodiments, a cross-correlation without a fixed reference, such as the correlation reference channel, may be incorporated into the acoustic echo cancellation process, and an exemplary method 1200 for operating the playback device 700 that incorporates a correlation reference channel is illustrated in FIG. 12.

At 1202, the playback device 700 receives a source stream of audio, and the playback device 700 has a first speaker driver 752a, at least a second speaker driver 752b, and at least one microphone 720, as previously described. As previously explained, the playback device 700 may include a third speaker driver and any number of additional speaker drivers. The source stream of audio may be received via the network interface 714 of the playback device 700, and the source stream of audio may include source audio content to be played back by the playback device 700, as previously explained. The source audio content may include a first channel stream of audio, a second channel stream of audio, and, optionally, a third channel stream of audio or additional channel streams of audio, as previously explained.

At 1204, the playback device 700 may play back, via the first speaker driver 752a, the first channel stream of audio, thereby producing a first channel audio output 756a, as previously described. At 1206, the playback device 700 may play back, via the second speaker driver 752b, the second channel stream of audio, thereby producing a second channel audio output 756b, as previously described. Also as previously described, the playback device 700 may play back, via the third speaker driver, the third channel stream of audio, thereby producing a third channel audio output. Further speaker drivers of the playback device 700 may playback further channel streams of audio, thereby producing further channel audio outputs.

At 1208, a microphone 720 receives or captures the stream of audio may be received or captured by the microphone 720. As previously described, the captured stream of audio may be transmitted via the communication link 772 to a processor 770. The captured stream of audio includes a first portion corresponding to the first channel audio output 756a, a second portion corresponding to the second channel audio output 756b, and a portion corresponding to a vocal command 758 issued by a user 760, and the captured stream of audio has a first signal-to-noise ratio. As previously explained, the captured stream of audio may also include a third portion corresponding to the third channel audio output and additional portions corresponding to additional channels of audio output.

At 1210, one or more processors associated with the playback device 700 may determine or select a first subset of the first channel stream of audio, the second channel stream of audio, and, optionally, the third channel stream of audio (and any additional channel streams of audio) based on one or more parameters. Moreover, one or more processors associated with the playback device 700 may determine or select a second subset of the first channel stream of audio, the second channel stream of audio, and, optionally, the third channel stream of audio (and any additional channel streams of audio) based on one or more parameters. Additional subsets may also be determined or selected.

In some embodiments, one or more processors associated with the playback device 700 selecting or determining the first subset of the first channel stream of audio, the second channel stream of audio, and, optionally, the third channel stream of audio based on one or more parameters may include or comprise cross-correlating the first channel stream of audio, the second channel stream of audio, and, optionally, the third channel stream of audio. Selecting or determining the first subset may be based on one or more parameters that result from the cross-correlation. For example, selecting or determining the first subset may include selecting or determining signal components from any or all of the first channel stream of audio, the second channel stream of audio, and the third channel stream of audio having an energy content above a first threshold energy content and/or a correlation above a first threshold correlation.

In some embodiments, selecting or determining the second subset of the first channel stream of audio, the second channel stream of audio, and, optionally, the third channel stream of audio based on one or more parameters may include or comprise cross-correlating the first channel stream of audio, the second channel stream of audio, and, optionally, the third channel stream of audio. Selecting or determining the second subset may be based on one or more parameters that result from the cross-correlation. For example, selecting or determining the second subset may include selecting or determining signal components from any or all of the first channel stream of audio, the second channel stream of audio, and the third channel stream of audio having an energy content above a second threshold energy content and/or a correlation above a second threshold correlation. The second threshold energy content may be different than (e.g., less than) the first threshold energy content and/or the second threshold correlation may be different than (e.g., less than) the first threshold correlation.

In some embodiments, the first subset may be signals common to the first channel stream of audio, the second channel stream of audio, and, optionally, the third channel stream of audio. A second subset may then be signals unique to the first channel stream of audio, a third subset may be signals unique to the second channel stream of audio, and a fourth subset may be signals unique to the third channel stream of audio.

The cross-correlations may be performed in any manner, and any or all of the cross-correlations may be performed by a processor disposed on or within a housing of the playback device 700, such as the processor 702, the processor 770, the audio processing components 208 (illustrated in FIG. 2), and/or any other processor component associated with the playback device 700. Alternatively, any or all of the cross-correlations may be performed by a processor disposed remote from the playback device 700.

At 1212, one or more processors associated with the playback device 700 performs acoustic echo cancellation on the first subset, and performing acoustic echo cancellation on the first subset produces a first acoustic echo cancellation output. Optionally, one or more processors associated with the playback device 700 may performs acoustic echo cancellation on the second subset, and performing acoustic echo cancellation on the second subset produces a second acoustic echo cancellation output. In addition, one or more processors associated with the playback device 700 may optionally perform acoustic echo cancellation on the third (and further) subsets to produce a third (and further) acoustic echo cancellation output. As previously explained, the processor 770 may perform acoustic echo cancellation on any or all of the first subset, the second subset, and the third subset.

At 1214, one or more processors associated with the playback device 700 applies the first acoustic echo cancellation output to the recorded stream of audio, thereby increasing the signal-to noise ratio of the captured stream of audio from the first signal-to-noise ratio to a second signal-to-noise ratio, and the second signal-to-noise ratio is greater than the first signal-to-noise ratio. In some embodiments, one or more processors associated with the playback device 700 may apply the first acoustic echo cancellation output to the recorded stream of audio, the second acoustic echo cancellation output to the captured stream of audio, and, optionally, the third (and further) acoustic echo cancellation output to the captured stream of audio to increase the signal-to noise ratio of the captured stream of audio from the first signal-to-noise ratio to the second signal-to-noise ratio.

In some embodiments, the one or more processors associated with the playback device 700 may apply the first acoustic echo cancellation output, the second acoustic echo cancellation output, and optionally, the third (and additional) acoustic echo cancellation outputs to the recorded stream of audio in any manner. For example, two or more of the first acoustic echo cancellation output, the second acoustic echo cancellation output, and optionally, the third (and additional) acoustic echo cancellation outputs may be simultaneously applied to the recorded stream of audio. In other examples, the first acoustic echo cancellation output, the second acoustic echo cancellation output, and optionally, the third (and additional) acoustic echo cancellation outputs may be applied to the recorded stream of audio in parallel, in series, or in any combination thereof.

As previously explained, the one or more processors that performs acoustic echo cancellation may be the same processor that applies the acoustic echo cancellation output to the captured stream of audio. In some embodiments, the one or more processors may include the processor 770, the processor 702, the audio processing components 208 (illustrated in FIG. 2), and/or any other processor component associated with the playback device 700 or any other device. In some embodiments, one or more of the processors that performs acoustic echo cancellation may be different than one or more of the processors that applies the acoustic echo cancellation output to the captured stream of audio.

The acoustic echo cancellation may be performed, for example, according to one or more embodiments of the disclosed technology. The one or more processors associated with the playback device 700 may apply the first acoustic echo cancellation output, and, optionally, the second acoustic echo cancellation output, and the third (and additional) acoustic echo cancellation outputs to the captured stream of audio in any known manner to increase the signal-to noise ratio of the captured stream of audio from the first signal-to-noise ratio to the second signal-to-noise ratio. That is, with reference to the embodiment of FIG. 7, applying the first and second (and further) acoustic echo cancellation outputs to the captured stream of audio results in a second signal-to-noise ratio in the one or more communication links 774, and the second signal-to-noise ratio is greater than the first signal-to-noise ratio associated with the captured stream of audio prior to the application of the acoustic echo cancellation output (e.g., in the one or more communication links 772). In some embodiments, the difference between the second signal-to-noise ratio and the first signal-to-noise ratio may be within the range of 10 db (or approximately 10 dB) to 20 dB (or approximately 20 dB). Thus, the vocal command 758 of a user remains in the captured stream of audio for processing by the component 776 while the "noise" of the first channel audio output 756*a* and the second channel audio output 756*b* is reduced or removed.

As previously described, processing associated with acoustic echo cancellation may be performed in the Short-Time Fourier Transform ["STFT"] domain. That is, the first, second, and third subset of the channel streams of audio and the captured stream of audio (and or any other signals associated with acoustic echo cancellation) may be transformed into a STFT domain. In addition, the adaptive cross-band filter may be used in the acoustic echo cancellation operation on any suitable set of signals. Further, the filter applied during application of the first and second (and, optionally, third) acoustic echo cancellation output to the captured stream of audio may be a compound filter comprising combined transfer functions for each channel to each microphone (which may be one of an array of microphones) and/or each speaker driver to each microphone.

Thus, by determining the cross-correlation between the first channel stream of audio, the second channel stream of audio and any additional streams of audio, the computational complexity of the acoustic echo cancellation operation can be reduced relative to performing acoustic echo cancellation on each of the first channel stream of audio, the second channel stream of audio, and the third channel stream of audio, as previously described.

Performing acoustic echo cancellation as described herein (and/or applying an acoustic echo cancellation output to the captured stream of audio) may be triggered in any suitable manner. For example, one or more processors associated with the playback device 700 may detect that a playback function is initiated by the playback device 700. In other examples, one or more processors associated with the playback device 700 may detect that an unmute command is received by the playback device after the playback function is initiated.

The examples provided herein involve methods, playback devices, and tangible, non-transitory computer-readable mediums. An embodiment of a method of operating a playback device may include receiving, via a network interface of the playback device, a source stream of audio comprising source audio content to be played back by the playback device. The playback device comprises a first speaker driver and at least a second speaker driver and further comprises at one or more microphone. The source audio content comprises a first channel stream of audio and a second channel stream of audio. The method may also include producing a first channel audio output by playing back, via the first speaker driver, the first channel stream of audio, and producing a second channel audio output by playing back, via the second speaker driver, the second channel stream of audio. The method may further include receiving, via the one or more microphones, a captured stream of audio comprising a first portion corresponding to the first channel audio output, and further comprising a second portion corresponding to the second channel audio output, wherein the captured stream of audio has a first signal-to-noise ratio. The method may additional include combining the first channel stream of audio and the second channel stream of audio into a compound audio signal and transforming the compound audio signal and the captured stream of audio into a Short-Time Fourier Transform domain. The method also includes performing acoustic echo cancellation on the compound audio signal, and performing acoustic echo cancellation on the compound audio signal produces an acoustic echo cancellation output. The method may additionally include applying the acoustic echo cancellation output to the captured stream of audio, thereby increasing the signal-to noise ratio of the captured stream of audio from the first signal-to-noise ratio to a second signal-to-noise ratio, wherein the second signal-to-noise ratio is greater than the first signal-to-noise ratio.

In another aspect, a non-transitory computer-readable medium is provided. The non-transitory computer readable medium has stored thereon instructions executable by a computing device to cause the computing device to perform functions. The functions include receiving, via a network interface of the playback device, a source stream of audio comprising source audio content to be played back by the playback device, and the playback device comprises a first speaker driver and at least a second speaker driver and further comprises at least one microphone. The source audio content comprises a first channel stream of audio and a second channel stream of audio. The functions may also include producing a first channel audio output by playing back, via the first speaker driver, the first channel stream of audio, and producing a second channel audio output by playing back, via the second speaker driver, the second channel stream of audio. The functions may further include receiving, via the one or more microphones, a captured stream of audio comprising a first portion corresponding to the first channel audio output, and further comprising a second portion corresponding to the second channel audio output, wherein the captured stream of audio has a first signal-to-noise ratio. The functions may additional include combining the first channel stream of audio and the second channel stream of audio into a compound audio signal and transforming the compound audio signal and the captured stream of audio into a Short-Time Fourier Transform domain. The functions also include performing acoustic echo cancellation on the compound audio signal, and performing acoustic echo cancellation on the compound audio signal produces an acoustic echo cancellation output. The functions may additionally include applying the acoustic echo cancellation output to the captured stream of audio, thereby increasing the signal-to noise ratio of the captured stream of audio from the first signal-to-noise ratio to a second signal-to-noise ratio, wherein the second signal-to-noise ratio is greater than the first signal-to-noise ratio.

In yet another aspect, a playback device is provided. The playback device includes a first speaker driver, at least a second speaker driver, one or more microphones, a processor, and a memory. The memory has stored thereon instructions executable by the processor to cause the payback device to perform functions. The functions include receiving, via a network interface of the playback device, a source stream of audio comprising source audio content to be played back by the playback device. The source audio content comprises a first channel stream of audio and a second channel stream of audio. The functions may also include producing a first channel audio output by playing back, via the first speaker driver, the first channel stream of audio, and producing a second channel audio output by playing back, via the second speaker driver, the second channel stream of audio. The functions may further include receiving, via the one or more microphones, a captured stream of audio comprising a first portion corresponding to the first channel audio output, and further comprising a second portion corresponding to the second channel audio output, wherein the captured stream of audio has a first signal-to-noise ratio. The functions may additionally include combining the first channel stream of audio and the second channel stream of audio into a compound audio signal. The functions also include performing acoustic echo cancellation on the compound audio signal, and performing acoustic echo cancellation on the compound audio signal produces an acoustic echo cancellation output. The functions may additionally include applying the acoustic echo cancellation output to the captured stream of audio, thereby increasing the signal-to noise ratio of the captured stream of audio from the first signal-to-noise ratio to a second signal-to-noise ratio, wherein the second signal-to-noise ratio is greater than the first signal-to-noise ratio.

In a further aspect, the captured stream of audio comprises a third portion corresponding to a vocal command issued by a user, and wherein increasing the signal-to-noise ratio of the captured stream of audio from the first signal-to-noise ratio to the second signal-to-noise ratio results in the first portion and second portion being eliminated or minimized in the captured stream of audio.

In a further aspect, the functions also include detecting a trigger to perform acoustic echo cancellation on the compound audio signal, wherein detecting the trigger comprises detecting that (a) a playback function is initiated by the playback device or (b) an unmute command is received by the playback device after the playback function is initiated.

A further aspect of a method of operating a playback device may include receiving, via a network interface of the playback device, a source stream of audio comprising source audio content to be played back by the playback device. The playback device comprises a first speaker driver and at least a second speaker driver and further comprises one or more microphones. The source audio content comprises a first channel stream of audio and a second channel stream of audio. The method may also include producing a first channel audio output by playing back, via the first speaker driver, the first channel stream of audio, and producing a second channel audio output by playing back, via the second speaker driver, the second channel stream of audio. The method may further include receiving, via the one or more microphones, a captured stream of audio comprising a first portion corresponding to the first channel audio output and a second portion corresponding to the second channel audio output and further comprising a second portion corresponding to the second channel audio output, wherein the captured stream of audio has a first signal-to-noise ratio. The method may also include performing a singular value decomposition on the first channel stream of audio and the second channel stream of audio to result in a combined set of signal components. The method may additionally include selecting a subset of the combined set of signal components based on one or more parameters. The method may also include performing acoustic echo cancellation on the subset of the combined set of signal components, wherein performing acoustic echo cancellation on the subset of the combined set of signal produces a first acoustic echo cancellation output. The method may additionally include applying the first acoustic echo cancellation output to the captured stream of audio, thereby increasing the signal-to noise ratio of the captured stream of audio from the first signal-to-noise ratio to a second signal-to-noise ratio, wherein the second signal-to-noise ratio is greater than the first signal-to-noise ratio.

In another aspect, a non-transitory computer-readable medium is provided. The non-transitory computer readable medium has stored thereon instructions executable by a computing device to cause the computing device to perform functions. The functions include receiving, via a network interface of the playback device, a source stream of audio comprising source audio content to be played back by the playback device. The playback device comprises a first speaker driver and at least a second speaker driver and further comprises one or more microphones. The source audio content comprises a first channel stream of audio and a second channel stream of audio. The functions may also include producing a first channel audio output by playing back, via the first speaker driver, the first channel stream of audio, and producing a second channel audio output by playing back, via the second speaker driver, the second channel stream of audio. The functions may further include receiving, via the one or more microphones, a captured stream of audio comprising a first portion corresponding to the first channel audio output and a second portion corresponding to the second channel audio output and further comprising a second portion corresponding to the second channel audio output, wherein the captured stream of audio has a first signal-to-noise ratio. The functions may also include performing a singular value decomposition on the first channel stream of audio and the second channel stream of audio to result in a combined set of signal components. The functions may additionally include selecting a subset of the combined set of signal components based on one or more parameters. The functions may also include performing acoustic echo cancellation on the subset of the combined set of signal components, wherein performing acoustic echo cancellation on the subset of the first set of signal produces a first acoustic echo cancellation output. The functions may additionally include applying the first acoustic echo cancellation output to the captured stream of audio, thereby increasing the signal-to noise ratio of the captured stream of audio from the first signal-to-noise ratio to a second signal-to-noise ratio, wherein the second signal-to-noise ratio is greater than the first signal-to-noise ratio.

In yet another aspect, a playback device is provided. The playback device includes a first speaker driver, at least a second speaker driver, one or more microphones, a processor and a memory. The memory has stored thereon instructions executable by the processor to cause the payback device to perform functions. The functions include receiving, via a network interface of the playback device, a source stream of audio comprising source audio content to be played back by the playback device. The source audio content comprises a first channel stream of audio and a second channel stream of audio. The functions may also include producing a first channel audio output by playing back, via the first speaker driver, the first channel stream of audio, and producing a second channel audio output by playing back, via the second speaker driver, the second channel stream of audio. The functions may further include receiving, via the one or more microphones, a captured stream of audio comprising a first portion corresponding to the first channel audio output and a second portion corresponding to the second channel audio output, wherein the captured stream of audio has a first signal-to-noise ratio. The functions may also include performing a singular value decomposition on the first channel stream of audio and the second channel stream of audio to result in a combined set of signal components. The functions may additionally include selecting a subset of the combined set of signal components based on one or more parameters. The functions may also include performing acoustic echo cancellation on the subset of the combined set of signal components, wherein performing acoustic echo cancellation on the subset of the combined set of signal produces a first acoustic echo cancellation output. The functions may additionally include applying the first acoustic echo cancellation output to the captured stream of audio, thereby increasing the signal-to noise ratio of the captured stream of audio from the first signal-to-noise ratio to a second signal-to-noise ratio, wherein the second signal-to-noise ratio is greater than the first signal-to-noise ratio.

In a further aspect, the captured stream of audio comprises a third portion corresponding to a vocal command issued by a user, and wherein increasing the signal-to-noise ratio of the captured stream of audio from the first signal-to-noise ratio to the second signal-to-noise ratio results in the first portion and second portion being eliminated or minimized in the captured stream of audio.

In a still further aspect, the functions may additionally include detecting a trigger to perform acoustic echo cancellation on the on the subset of the first set of signal components or the subset of the second set of signal components, wherein detecting the trigger comprises detecting that (a) a playback function is initiated by the playback device or (b) an unmute command is received by the playback device after the playback function is initiated.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A method of operating a playback device having a first speaker driver, at least a second speaker driver, and one or more microphones, the method comprising:

receiving, via a network interface of the playback device, a source stream of audio comprising source audio content to be played back by the playback device, wherein the source audio content comprises a first channel stream of audio and a second channel stream of audio;

producing a first channel audio output by playing back, via the first speaker driver, the first channel stream of audio;

producing a second channel audio output by playing back, via the second speaker driver, the second channel stream of audio;

receiving, via the one or more microphones, a captured stream of audio comprising a first portion corresponding to the first channel audio output and a second portion corresponding to the second channel audio output, wherein the captured stream of audio has a first signal-to-noise ratio;

performing a singular value decomposition on the first channel stream of audio and the second channel stream of audio to result in a combined set of signal components;

selecting a subset of the combined set of signal components based on one or more parameters;

performing acoustic echo cancellation on the subset of the combined set of signal components, wherein performing acoustic echo cancellation on the subset of the combined set of signal components produces a first acoustic echo cancellation output; and applying the first acoustic echo cancellation output to the captured stream of audio, thereby increasing the signal-to noise ratio of the captured stream of audio from the first signal-to-noise ratio to a second signal-to-noise ratio, wherein the second signal-to-noise ratio is greater than the first signal-to-noise ratio.

2. The method of claim 1, wherein the captured stream of audio comprises a third portion corresponding to a vocal command issued by a user, and wherein applying the first acoustic echo cancellation output to the captured stream of audio, thereby increasing the signal-to-noise ratio of the captured stream of audio from the first signal-to-noise ratio to the second signal-to-noise ratio, results in the first portion and second portion being eliminated or minimized in the captured stream of audio.

3. The method of claim 1, further comprising:

transforming both of the subset of the combined set of signal components and the captured stream of audio into a Short-Time Fourier Transform domain.

4. The method of claim 1, wherein selecting the subset of the combined set of signal components based on the one or more parameters comprises selecting a subset of the combined set of signal components having at least one of (a) an energy content above a first threshold energy content or (b) a calculated variance above a first threshold variance.

5. The method of claim 1, wherein the playback device comprises a third speaker driver, wherein the source audio content comprises the first channel stream of audio, the second channel stream of audio, and a third channel stream of audio, and wherein the method further comprises producing a third channel audio output by playing back, via the third speaker driver, the third channel stream of audio.

6. The method of claim 5, wherein performing the singular value decomposition on the first channel stream of audio and the second channel stream of audio to result in the combined set of signal components comprises:

performing the singular value decomposition on the first channel stream of audio, the second channel stream of audio, and the third channel stream of audio to result in the combined set of signal components.

7. The method of claim 1, further comprising:
detecting a trigger to perform acoustic echo cancellation on the subset of the combined set of signal components, wherein detecting the trigger comprises detecting that (a) a playback function is initiated by the playback device or (b) an unmute command is received by the playback device after the playback function is initiated.

8. The method of claim 1, wherein performing the singular value decomposition on the first channel stream of audio is performed by one or more processors of the playback device,
wherein performing the singular value decomposition on the second channel stream of audio is performed by the one or more processors of the playback device,
wherein selecting the subset of the combined set of signal components based on the one or more parameters is performed by the one or more processors of the playback device,
wherein performing acoustic echo cancellation on the subset of the combined set of signal components is performed by the one or more processors of the playback device, and
wherein applying the first acoustic echo cancellation output to the captured stream of audio is performed by the one or more processors of the playback device.

9. A tangible, non-transitory computer-readable medium storing instructions that when executed by one or more processors cause a playback device to perform functions comprising:
receiving, via a network interface of the playback device, a source stream of audio comprising source audio content to be played back by the playback device, wherein the playback device comprises a first speaker driver and at least a second speaker driver and further comprises one or more microphones, and wherein the source audio content comprises a first channel stream of audio and a second channel stream of audio;
producing a first channel audio output by playing back, via the first speaker driver, the first channel stream of audio;
producing a second channel audio output by playing back, via the second speaker driver, the second channel stream of audio;
receiving, via the one or more microphones, a captured stream of audio comprising a first portion corresponding to the first channel audio output, and further comprising a second portion corresponding to the second channel audio output, wherein the captured stream of audio has a first signal-to-noise ratio;
performing a singular value decomposition on the first channel stream of audio and the second channel stream of audio to result in a combined set of signal components;
selecting a subset of the combined set of signal components based on one or more parameters;
performing acoustic echo cancellation on the subset of the combined set of signal components, wherein performing acoustic echo cancellation on the subset of the combined set of signal components produces a first acoustic echo cancellation output; and
applying the first acoustic echo cancellation output to the captured stream of audio, thereby increasing the signal-to-noise ratio of the captured stream of audio from the first signal-to-noise ratio to a second signal-to-noise ratio, wherein the second signal-to-noise ratio is greater than the first signal-to-noise ratio.

10. The computer-readable medium of claim 9, wherein the captured stream of audio comprises a third portion corresponding to a vocal command issued by a user, and wherein applying the first acoustic echo cancellation output to the captured stream of audio, thereby increasing the signal-to-noise ratio of the captured stream of audio from the first signal-to-noise ratio to the second signal-to-noise ratio, results in the first portion and second portion being eliminated or minimized in the captured stream of audio.

11. The computer-readable medium of claim 9, further comprising instructions that when executed by the one or more processors cause the playback device to perform functions comprising:
transforming both of the subset of the combined set of signal components and the captured stream of audio into a Short-Time Fourier Transform domain.

12. The computer-readable medium of claim 9, wherein selecting the subset of the combined set of signal components based on the one or more parameters comprises selecting a subset of the combined set of signal components having at least one of (a) an energy content above a first threshold energy content or (b) a calculated variance above a first threshold variance.

13. The computer-readable medium of claim 9,
wherein the playback device comprises a third speaker driver,
wherein the source audio content comprises the first channel stream of audio, the second channel stream of audio, and a third channel stream of audio, and
wherein the method further comprises producing a third channel audio output by playing back, via the third speaker driver, the third channel stream of audio.

14. The computer-readable medium of claim 13, wherein performing the singular value decomposition on the first channel stream of audio and the second channel stream of audio to result in the combined set of signal components comprises:
performing the singular value decomposition on the first channel stream of audio, the second channel stream of audio, and the third channel stream of audio to result in the combined set of signal components.

15. The computer-readable medium of claim 9, further comprising instructions that when executed by the one or more processors cause the playback device to perform functions comprising:
detecting a trigger to perform acoustic echo cancellation on the subset of the first combined set of signal components, wherein detecting the trigger comprises detecting that (a) a playback function is initiated by the playback device or (b) an unmute command is received by the playback device after the playback function is initiated.

16. The computer-readable medium of claim 9,
wherein performing the singular value decomposition on the first channel stream of audio is performed by the one or more processors,
wherein performing the singular value decomposition on the second channel stream of audio is performed by the one or more processors,
wherein selecting the subset of the combined set of signal components based on the one or more parameters is performed by the one or more processors,
wherein performing acoustic echo cancellation on the subset of the combined set of signal components is performed by the one or more processors, and wherein applying the first acoustic echo cancellation output to the captured stream of audio is performed by the one or more processors.

\* \* \* \* \*